United States Patent
Bentfeld et al.

(10) Patent No.: US 12,323,023 B2
(45) Date of Patent: Jun. 3, 2025

(54) METHOD FOR CONTROLLING A PLANAR DRIVE SYSTEM AND PLANAR DRIVE SYSTEM

(71) Applicant: BECKHOFF AUTOMATION GMBH, Verl (DE)

(72) Inventors: Lukas Bentfeld, Delbrück (DE); Johannes Beckhoff, Schloss Holte-Stukenbrock (DE)

(73) Assignee: Beckhoff Automation GmbH, Verl (DE)

( * ) Notice: Subject to any disclaimer, the term of this patent is extended or adjusted under 35 U.S.C. 154(b) by 453 days.

(21) Appl. No.: 17/961,253

(22) Filed: Oct. 6, 2022

(65) Prior Publication Data

US 2023/0055324 A1 Feb. 23, 2023

Related U.S. Application Data

(63) Continuation of application No. PCT/EP2021/059800, filed on Apr. 15, 2021.

(30) Foreign Application Priority Data

Apr. 17, 2020 (EP) .................................... 20170127

(51) Int. Cl.
*H02K 41/03* (2006.01)
*H02K 11/215* (2016.01)
(Continued)

(52) U.S. Cl.
CPC ......... *H02K 41/031* (2013.01); *H02K 11/215* (2016.01); *H02K 41/03* (2013.01); *G01D 5/145* (2013.01); *H02K 1/14* (2013.01)

(58) Field of Classification Search
CPC ...... H02K 11/215; H02K 1/14; H02K 41/031; H02K 41/02; H02K 41/03; H02K 41/033; H02K 41/00; H02K 2201/08; G01D 5/145
(Continued)

(56) References Cited

U.S. PATENT DOCUMENTS

| 11,437,893 | B2 | 9/2022 | Brinkmann et al. |
| 2015/0338750 | A1* | 11/2015 | Yang .................. G03F 7/70758 355/72 |
| 2018/0205304 | A1* | 7/2018 | Lu ........................... H02K 3/26 |

FOREIGN PATENT DOCUMENTS

| DE | 10054376 A1 | 6/2001 |
| DE | 102012218039 A1 | 4/2014 |
| DE | 102017131320 A1 | 6/2019 |

OTHER PUBLICATIONS

International Preliminary Report on Patentability dated Apr. 5, 2022 in connection with International patent application No. PCT/EP2021/059800, 40 pages including English translation.

(Continued)

*Primary Examiner* — Alexander A Singh
(74) *Attorney, Agent, or Firm* — Dorsey & Whitney LLP

(57) ABSTRACT

A method for controlling a planar drive system includes identifying a preferred stator module direction with a preferred magnetic field or sensor direction, and identifying a preferred mover direction with a respective other of the preferred magnetic field or sensor direction; setting a magnetic orientation field with a magnet device; recording at least a measurement value of the magnetic orientation field with a magnetic field sensor device; determining an alignment of the preferred mover direction relative to the preferred stator module direction based on the measurement value of the component of the magnetic orientation field parallel to the preferred sensor direction; and determining a (Continued)

first orientation of the mover on the stator module, on the basis of the alignment of the preferred mover direction relative to the preferred stator module direction. The application also relates to a planar drive system.

15 Claims, 12 Drawing Sheets

(51) Int. Cl.
  *G01D 5/14* (2006.01)
  *H02K 1/14* (2006.01)
(58) Field of Classification Search
  USPC .......................................... 310/12.01, 12.05
  See application file for complete search history.

(56) References Cited

OTHER PUBLICATIONS

International Search Report and Written Opinion dated Jun. 17, 2021 in connection with International patent application No. PCT/EP2021/059800, 19 pages including English translation.
Extended European Search Report dated Oct. 14, 2020 in connection with European patent application No. 20170127.3, 16 pages including English translation.

* cited by examiner

METHOD FOR CONTROLLING A PLANAR DRIVE SYSTEM AND PLANAR DRIVE SYSTEM

CROSS-REFERENCE TO RELATED APPLICATIONS

The present patent application claims the priority of International Patent Application No. PCT/EP2021/059800, "Method for Controlling a Planar Drive System, and Planar Drive System," filed Apr. 15, 2021, which claims the priority of European Patent Application No. EP 20 170 127.3, "Verfahren Zum Steuern Eines Planarantriebssystems Und Planarantriebssystem," filed Apr. 17, 2020, the disclosure content of each of which is hereby incorporated by reference herein, in the entirety and for all purposes.

FIELD

The present application relates to a method for controlling a planar drive system, and to a planar drive system arranged to perform the method of controlling a planar drive system.

BACKGROUND

Planar drive systems may be used, among other things, in automation technology, in particular manufacturing technology, handling technology and process engineering. Planar drive systems may be used to move or position a moving element of a plant or machine in at least two linearly independent directions. Planar drive systems may comprise a permanently energized electromagnetic planar motor with a planar stator and a mover movable on the stator in at least two directions.

In a permanently energized electromagnetic planar motor, a driving force is exerted on the mover by current-carrying conductors magnetically interacting with driving magnets of a magnet assembly. The application particularly relates to embodiments of planar drive systems in which the drive magnets of an electric planar motor are arranged on the mover and the current-carrying conductors of the planar motor are arranged in a stationary planar stator.

In such a drive system, the mover comprises at least a first magnetic unit for driving the mover in a first direction and a second magnetic unit for driving the mover in a second direction linearly independent of the first direction, e.g. in a direction orthogonal to the first direction. The planar stator comprises at least a group of first energizable conductors magnetically interacting with the magnets of the first magnet unit to drive the mover in the first direction, and a group of second energizable conductors magnetically interacting with the magnets of the second magnet unit to drive the mover in the second direction. The first and second groups of conductors are generally independently energizable to allow independent movement of the mover in the first and second directions. If the conductors of the first and second groups themselves may be energized independently of one another at least in parts, a plurality of movers may be moved independently of each other on one stator at the same time.

To control a mover of a planar drive system, it is essential to be able to determine a position of the mover relative to the stator module or stator modules of the planar drive system. For this purpose, each stator module has at least one sensor module with a plurality of magnetic field sensors that are set up to detect the magnetic field of the mover, which makes it possible to determine the position of the mover relative to the respective sensor module or relative to the respective stator module. The more precisely such a determination of a position of the mover may be carried out, the more precisely a control of the planar drive system may be performed.

In addition to a position determination, which primarily detects a translational movement of the mover, it is advantageous to determine an orientation of the mover relative to the stator module to achieve a precise control of the mover. A determination of the orientation primarily detects a rotation of the mover around a rotational axis oriented perpendicularly to a stator surface of the stator module and running through a geometric center of the mover.

Determining the orientation of the mover relative to the stator module is of particular interest if a preferred orientation of the mover exists due to the respective application of the planar drive system, e.g. because the workpieces to be transported by the stator are to be transported with a preferred orientation.

Furthermore, determining the orientation of the mover relative to the stator module allows for an improved precision of the position determination of the mover on the stator module. Particularly in the case in which a position is determined based on an exact knowledge of the magnetic mover field of each individual mover, an exact determination of the orientation of the mover relative to the stator module may be advantageous. By knowing the exact orientation of the mover relative to the stator module, values of the magnetic mover field recorded by the magnetic field sensors for determining the position of the mover may be better interpreted, resulting in improved precision of the position determination.

Determining an orientation of the mover relative to the stator module is particularly challenging when, as in the case of the present application, the mover, and in particular the magnet assembly of the mover, is rotationally symmetrical with respect to the axis of rotation oriented perpendicular to the stator surface of the stator module. According to the application, the mover, and in particular the magnet assembly of the mover and the magnetic mover field generated thereby, is rotationally symmetrical with respect to a rotation about the axis of rotation oriented perpendicular to the stator surface by 90°, 180° and 270°, so that the mover and the magnetic mover field may be transduced into each other by a rotation by 90°, 180° or 270° and obviously 0° and 360°. Based on the embodiment of the mover, the magnet assembly and the magnetic mover field generated thereby, an orientation of 90°, 180°, or 270° is indistinguishable from an orientation of 0°.

SUMMARY

The present application provides a method for controlling a planar drive system, which allows for improved and more precise control of a mover due to improved orientation determination of the mover. The application further provides a planar drive system which is arranged to carry out the method according to the application.

EXAMPLES

A method of controlling a planar drive system is provided, the planar drive system comprising at least a controller, a stator module having a stator surface, and a mover that may be positioned on the stator surface. The stator module is arranged to generate magnetic fields for electrically controlling the mover along the stator surface, the mover having a magnet assembly for generating a magnetic mover field, wherein a magnetic coupling between the mover and the stator module is achievable via the magnetic stator fields and the magnetic mover field, wherein the stator module comprises a sensor module having a plurality of magnetic field sensors for determining a position of the mover, wherein the stator module or the mover comprises a magnet device for generating an magnetic orientation field, wherein the magnetic orientation field is rotationally asymmetrical with respect to rotation about a rotational axis perpendicular to the stator surface and has a preferred magnetic field direction, and wherein the respective other of the stator module and the mover comprises a magnetic field sensor device having a preferred sensor direction for detecting the magnetic orientation field along the preferred sensor direction.

The method comprises:
- identifying a preferred stator module direction of the stator module with one of the preferred magnetic field direction or the preferred sensor direction, and identifying a preferred mover direction of the mover with the respective other of the preferred magnetic field direction and the preferred sensor direction in a preferred direction identifying step, wherein the preferred stator module direction is oriented in parallel to the stator surface of the stator module, and wherein the preferred mover direction is oriented in parallel to a running surface of the mover;
- providing the magnetic orientation field by the magnet device in a magnetic field setting step;
- taking at least a measurement value of the magnetic orientation field by the magnetic field sensor device in a magnetic field determining step, the at least one measurement value of the magnetic orientation field comprising at least one value of a component of the magnetic orientation field in a direction parallel to the preferred sensor direction;
- determining an alignment of the preferred mover direction relative to the preferred stator module direction based on the measurement value of the component of the magnetic orientation field in parallel to the preferred sensor direction in an alignment determining step;
- determining a first orientation of the mover on the stator module on the basis of the alignment of the preferred mover direction relative to the preferred stator module direction in an orientation determining step, wherein a first orientation of the mover relative to the stator module is transferable to a second orientation of the mover relative to the stator module via a rotation of the mover relative to the stator module about the axis of rotation oriented perpendicularly with regard to the stator surface and extending through a geometric center of the mover.

This provides the technical advantage of providing a method for controlling a planar drive system suitable for determining an orientation of a mover of the planar drive system relative to a stator module of the planar drive system.

BRIEF DESCRIPTION OF THE DRAWINGS

The invention is explained in more detail with reference to the accompanying drawings, in which.

DETAILED DESCRIPTION

Figure 1:
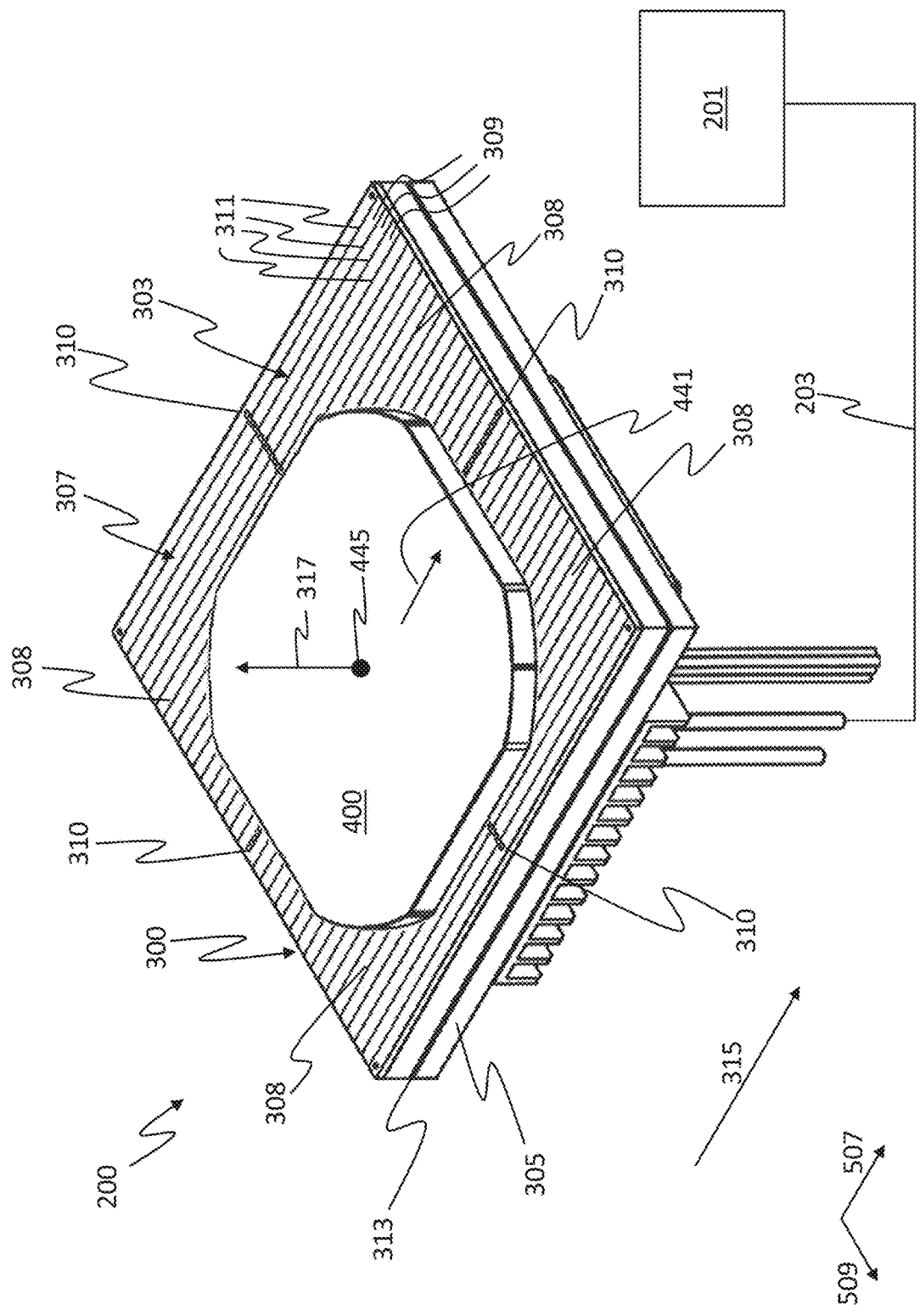
FIG. 1 shows a schematic depiction of a planar drive system having a stator module and a mover according to an embodiment.

For purposes of the application, an orientation of the mover relative to the stator module is provided via an alignment of a preferred mover direction relative to a preferred stator module direction. A first orientation of the mover relative to the stator module may be converted into a second orientation of the mover relative to the stator module via a rotation of the mover about a rotational axis extending perpendicularly with regard to a stator surface of the stator module and passing through a geometric center of the mover.

An alignment of the preferred mover direction relative to the preferred stator module direction may e.g. be expressed by an angle between the preferred mover direction and the preferred stator module direction.

For the purposes of the application, a preferred mover direction is a direction of the mover which may be selected as desired and by which a rotation of the mover about the rotational axis may be determined by a corresponding re-alignment of the defined preferred mover direction. The preferred mover direction is arbitrarily selectable and serves exclusively for the distinguishability of different orientations of the mover relative to the stator module, in particular if the mover is embodied with a rotationally symmetrical shape. However, the preferred mover direction is independent of the embodiment of the mover and may be freely selected independently of it.

For the purposes of the application, a preferred stator module direction is in this context a direction parallel to the stator surface of the stator module that may be selected as required, via which an alignment of the preferred mover direction and thus an orientation of the mover relative to the stator module may be defined.

For determining an orientation of a mover relative to the stator module of the planar drive system, the planar drive system comprises a magnetic device for generating a magnetic orientation field and a magnetic field sensor device for detecting the magnetic orientation field. The magnetic orientation field is rotationally asymmetric with respect to the axis of rotation oriented perpendicularly to the stator surface and comprises a preferential magnetic field direction. The magnetic field sensor device has a preferred magnetic field sensor direction and is set up to detect components of the magnetic orientation field parallel or antiparallel to the preferred sensor direction.

In order to determine the orientation of the mover relative to the stator module, the magnetic field device is either embodied on the mover or on the stator module. The magnetic field sensor device is embodied on the respective other component of the planar drive system, i.e. either on the stator module or the mover.

By identifying the preferred sensor direction with the preferred mover direction or the preferred stator module direction, depending on whether the magnetic field sensor device is embodied at the mover or at the stator module, and after identifying the preferred magnetic field direction with the preferred mover direction or the preferred stator module direction, depending on whether the magnetic field device is embodied at the mover or at the stator module, an alignment of the preferred sensor direction relative to the preferred magnetic field direction and, associated therewith, an alignment of the corresponding preferred mover direction relative to the preferred stator module direction may be determined by the magnetic field sensor device by recording measurement values of a component of the magnetic orientation field parallel or antiparallel to the preferred sensor direction. On the basis of the determined alignment of the preferred mover direction relative to the preferred stator module direction, an orientation of the mover relative to the stator module may be determined.

This has the particular advantage that, in the case of a rotationally symmetrically embodied mover, which may be transduced in itself in particular by rotations around 90°, 180° or 270°, an orientation relative to the stator module, which comprises a corresponding rotation by 90°, 180° or 270°, may be determined. This makes it possible to unambiguously determine the orientation of the mover relative to the stator module, thereby allowing for effective control of the mover.

According to an embodiment, the method further comprises:
  determining a position of the mover relative to the stator module by taking a plurality of measurement values of the magnetic mover field of the mover by magnetic field sensors of the sensor module of the stator module in a position determining step, wherein a first position of the mover relative to the stator module may be transduced into a second position of the mover relative to the stator module via a translation of the geometric center of the mover relative to the stator module in a translation direction running perpendicularly with regard to the rotational axis.

This provides the technical advantage of providing effective control of the planar drive system. Determining the position of the mover on the stator module allows for a direct control of the mover by corresponding stator conductors of the stator module. Furthermore, determining a position allows for selecting those magnetic field sensors of the sensor module of the stator module, which are positioned in the direct vicinity of the mover and are thus required for a further control and further position determinations of the mover.

According to an embodiment, the method further comprises:
  providing a magnetic locking field by the stator module for locking the mover in position in a locking step, wherein the magnetic locking field is oppositely aligned to the magnetic mover field in such a way that an attractive magnetic coupling is generated between the magnetic locking field and the magnetic mover field.

This achieves the technical advantage that a precise determination of the orientation of the mover relative to the stator module may be achieved. By locking the mover in the determined position relative to the stator module, further movement of the mover relative to the stator module during the determination of the orientation is prevented. This provides a more precise orientation determination of the mover relative to the stator module. In addition, magnetic coupling between the magnetic orientation field required for orientation determination with either the magnetic mover field of the mover or the magnetic stator field of the stator module, which would result in movement of the mover relative to the stator module, may be prevented.

According to an embodiment, the method further comprises:
  orienting the mover from the first orientation to a second orientation based on the alignment of the preferred mover direction relative to the preferred stator module direction in an orientation step.

This provides the technical advantage of providing precise control of the planar drive system. After determining the orientation of the mover relative to the stator module, a change in the orientation of the mover relative to the stator module may be achieved. In particular, for applications in which a specific orientation of the mover relative to the stator module, e.g. due to a predetermined orientation of the workpieces to be transported by the mover, a change in the orientation of the mover relative to the stator module is advantageous. This provides precise and widely applicable control of the planar drive system.

According to an embodiment, the magnet device is embodied at the stator module and the magnetic field sensor device is embodied at the mover, wherein the preferred stator module direction is identified with the preferred magnetic field direction and the preferred mover direction is identified with the preferred sensor direction, wherein the magnetic field sensor device comprises at least a 2D Hall sensor or 3D Hall sensor, wherein the preferred sensor direction of the magnetic field sensor device is defined by a measuring channel of the Hall sensor, and wherein the magnet device is formed by a stator unit of the stator module for generating the stator fields for driving the mover.

This achieves the technical advantage that an efficient method for controlling the planar drive system may be provided. By embodying the magnetic field sensor device at the mover in the form of at least one 2D or 3D Hall sensor and by embodying the magnetic device at the stator module in the form of a stator unit or a plurality of stator conductors of the stator unit of the stator module the stator conductor or the stator unit of the stator module may be used to generate the magnetic orientation field, which is used to generate the stator field for controlling the mover.

The magnetic orientation field may thus be achieved via the controller of the planar drive system by driving the stator module. An additional component of the planar drive system for providing the magnetic field device may thus be avoided and the control for generating the magnetic orientation field may be achieved via the already implemented controller. Furthermore, by embodying the at least one 2D or 3D Hall sensor at the mover, a reliable and precise determination of the magnetic orientation field may be achieved by the magnetic field sensor device. Furthermore, the preferred sensor direction is clearly defined by at least one measuring channel of the Hall sensor.

For the purposes of the application, a measuring channel of the Hall sensor is an X, Y or Z measuring channel of the 2D or 3D Hall sensor.

According to an embodiment, the method further comprises:
- determining a plurality of values of the magnetic orientation field for a plurality of different alignments of the preferred mover direction relative to the preferred stator module direction in a determining step; and
- determining a relation between a value of the magnetic orientation field and an alignment of the preferred mover direction relative to the preferred stator module direction based on the plurality of values of the magnetic orientation field for the plurality of different alignments of the preferred mover direction relative to the preferred stator module direction in a relation determining step;
- wherein the alignment determining step comprises:
- comparing the measurement value of the component of the magnetic orientation field in parallel to the preferred sensor direction with the relation between a value of the magnetic orientation field and an alignment of the preferred mover direction relative to the preferred stator module direction in a comparing step.

This achieves the technical advantage of providing a precise and efficient method for controlling the planar drive system. For this purpose, a relation between the value of the magnetic orientation field and an alignment of the preferred mover direction relative to the preferred stator module direction is generated on the basis of a plurality of values of the magnetic orientation field recorded for a plurality of different alignments of the preferred mover direction relative to the preferred stator module direction. This relation between a value of the magnetic orientation field and a corresponding alignment of the preferred mover direction relative to the preferred stator module direction corresponding to a corresponding orientation of the mover relative to the stator module may be used to determine an alignment of the preferred mover direction relative to the preferred stator module direction performed to control the planar drive system in the alignment determining step, a value of the component of the magnetic orientation field measured for this purpose, oriented in parallel to the preferred sensor direction of the magnetic field sensor device is compared to corresponding values of the magnetic orientation field in accordance with the determined relation between the magnetic orientation field and the alignment of the preferred mover direction, and an alignment of the preferred mover direction corresponding to the measurement value of the magnetic orientation field is determined based on the relation between the value of the magnetic orientation field and a corresponding alignment of the preferred mover direction relative to the preferred stator module direction.

A relation between values of the magnetic orientation field and different orientations of the mover relative to the stator module may e.g. be stored in a corresponding look-up table. Alternatively, a relation may be expressed in a corresponding mathematical function that describes a unique assignment between values of the magnetic orientation field and different orientations of the mover.

This allows for simple and precise determining of the alignment of the preferred mover direction relative to the preferred stator module direction and thus an orientation of the mover relative to the stator module based on recorded measurement values of the magnetic orientation field.

According to an embodiment, the determining step comprises:
- recording a plurality of measurements of components of the magnetic orientation field in parallel to preferred sensor directions of the magnetic field sensor device for a plurality of different alignments of the preferred mover direction relative to the preferred stator module direction by the magnetic field sensor device in a measuring step; or
- calculating the plurality of values of components of the magnetic orientation field in parallel to preferred sensor directions of the magnetic field sensor device for the plurality of different alignments of the preferred mover direction relative to the preferred stator module direction based on a model description of the magnetic orientation field in a simulating step.

This achieves the technical advantage that a precise and reliable determination of the orientation of the mover relative to the stator module may be achieved. For this purpose, in order to determine the relation between an expected measurement value of the magnetic orientation field for a specific orientation of the preferred mover direction relative to the preferred stator module direction, i.e.: a specific alignment of the mover relative to the stator module, for a plurality of different orientations of the mover relative to the stator module, a plurality of measurement values of a component of the magnetic orientation field parallel to the preferred sensor direction of the magnetic field sensor device are recorded for a plurality of different orientations of the mover relative to the stator module, respectively for a plurality of different alignments of the preferred mover direction relative to the preferred stator module direction.

On the basis of these measurement values, the corresponding relation between the expected measurement value of the magnetic orientation field and the associated alignment of the preferred mover direction relative to the preferred stator module direction may be made in the following. By measuring the plurality of measurement values of the magnetic orientation field for the plurality of different orientations of the mover relative to the stator module, a precise and reliable determination of the relation between the expected measurement value of the magnetic orientation field and a corresponding alignment of the preferred mover direction relative to the preferred stator module direction and, associated therewith, a relation between an expected value of the magnetic orientation field and a corresponding orientation of the mover relative to the stator module may be achieved. Hereby, the orientation of the mover may be determined precisely and reliably.

As an alternative, the plurality of values of the magnetic orientation field for a plurality of different orientations of the mover relative to the stator module may be achieved by a simulation based on a model description of the magnetic orientation field. Knowing the spatial configuration of the magnetic orientation field, expected measurement values of the magnetic orientation field may be calculated for any orientations of the mover relative to the stator module and a corresponding relation between magnetic orientation field and alignment of the preferred mover direction relative to the preferred stator module direction may be obtained based on the calculated values of the magnetic orientation field. This allows for the orientation of the mover relative to the stator module to be determined as precisely as possible. In addition, an individual relation between the magnetic orientation field and the alignment of the preferred mover direction relative to the preferred stator module direction or between the magnetic orientation field and the orientation of the mover relative to the stator module may be determined for each mover of the planar drive system. This allows for individual characteristics of individual movers to be taken into account, so that the most precise and accurate determination of the orientation may be achieved by recording a plurality of measurement values of the magnetic orientation field.

According to an embodiment, the comparison in the comparing step is carried out via an approximation method.

This provides the technical advantage that a precise and reliable determination of the alignment of the mover relative to the stator module may be achieved. By performing an approximation method for determining the alignment of the preferred mover direction relative to the preferred stator module direction in the course of a comparison of the recorded measurement values of the magnetic orientation field with the corresponding relation between expected values of the magnetic orientation field for arbitrary orientations of the mover relative to the stator module, it may be achieved that for arbitrary values of the magnetic orientation field the most precise determination of the associated orientation of the mover relative to the stator module is achievable.

The approximation method may e.g. be based on a least square method in which a difference between a measurement value of the component of the magnetic orientation field parallel to the preferred sensor direction and a value of the magnetic orientation field for a certain alignment of the preferred mover direction relative to the preferred stator module direction is minimized according to the relation, and thus the corresponding value of the magnetic orientation field of the relation is determined. Based on the relation, an orientation of the mover relative to the stator module corresponding to the measurement value of the magnetic orientation field may be determined.

In particular, if the relation comprises a look-up table in which values of the magnetic orientation field are assigned to orientations of the mover, the corresponding values of the magnetic orientation field of the look-up table may be determined via the least square method from the measurement values of the magnetic orientation field, on the basis of which the corresponding orientations of the mover relative to the stator module may then be determined via the allocation in the look-up table.

According to an embodiment, the mover further comprises a transmission unit arranged to transmit the measurement values of the magnetic orientation field recorded in the magnetic field determining step to the controller, and wherein the alignment determining step and the orientation determining step are performed by the controller.

This achieves the technical advantage that no additional components, in particular a processor unit, need to be embodied on the stator module to perform the alignment determining and orientation determining steps. By transmitting the corresponding data with the transmission unit formed on the mover, all calculation steps may be performed by the controller of the planar drive system. Thus, the method for controlling a planar drive system may be executed by any planar drive system with only one additional component in the form of the magnetic field sensor device.

According to an embodiment, the mover further comprises a processor unit configured to carry out the alignment determining step and the orientation determining step, and a transmission unit configured to transmit the alignment determined in the alignment determining step and/or the orientation determined in the orientation determining step to the controller.

This achieves the technical advantage that data transmission between the mover and the controller of the planar drive system may be achieved with the smallest possible data volume. With the processor unit formed at the mover, which is set up to carry out the alignment determining step and the orientation determining step and the associated evaluation of the recorded measurement values of the magnetic orientation field, it is achieved that instead of transmitting the measurement values of the magnetic orientation field recorded by the magnetic field sensor device from the mover to the controller, exclusively the evaluated data, in particular the calculated alignment of the preferred mover direction relative to the preferred stator module direction or the calculated orientation of the mover relative to the stator module, are transmitted to the controller for further processing. This may substantially reduce the volume of data to be transmitted and simplify and accelerate data transmission.

According to an embodiment, a power supply of the magnetic field sensor device is configured as a wireless power supply.

This achieves the technical advantage that no additional wiring of the mover of the planar drive system is required and, associated with this, a reduction in the freedom of movement of the mover on the stator module for power supply. A power supply to the magnetic field sensor device of the mover may be achieved via a wireless power supply in the form of a corresponding modulation of the stator field generated by the stator module. Apart from additional wiring, an additional energy source for supplying energy to the magnetic field sensor device may thus also be dispensed with.

According to an embodiment, the magnetic field sensor device of the mover comprises a plurality of 2D Hall sensors or a plurality of 3D Hall sensors, wherein measuring channels of the 2D or 3D Hall sensors are arranged parallel or antiparallel with regard to one another, respectively.

This has the technical advantage that the magnetic orientation field may be determined as precisely as possible and, associated with this, the orientation of the mover relative to the stator module may be determined as precisely as possible. By using a plurality of 2D or 3D Hall sensors, a plurality of independent measurement values of the magnetic orientation field may be recorded, thus increasing the precision of determining the magnetic orientation field and, associated with this, a determination of the orientation of the mover relative to the stator module. The alignment of the individual measuring channels of the multiple 2D or 3D Hall sensors in parallel or antiparallel orientation allows for taking all measurement values of the individual 2D or 3D Hall sensors into account for determining the magnetic orientation field and thus allows for a further increase of the precision and measurement accuracy.

According to an embodiment, the magnetic field sensor device of the mover comprises two 2D Hall sensors or 3D Hall sensors, wherein the two 2D Hall sensors or 3D Hall sensors are arranged at a distance from each other at the mover, and wherein a connecting line between the two 2D, 3D Hall sensors passes through a geometric center of the running surface of the mover.

This achieves the technical advantage that by positioning the two 2D or 3D Hall sensors outside a geometric center of the mover's running surface, scattering effects of the magnetic stator field and the magnetic orientation field that occur at edges of the stator module or at contact points between a plurality of stator segments of the stator module may be compensated for to determine the magnetic orientation field by arranging the two 2D or 3D Hall sensors at the mover in such a way that for each positioning of the mover on the stator module or on a plurality of stator modules arranged in a row, at least one of the two 2D or 3D Hall sensors is arranged outside of the area in which the stray field of the magnetic stator field or the magnetic orientation field occurs. In this way, a measurement accuracy of the magnetic orientation field may be achieved.

According to an embodiment, the magnetic field sensor device of the mover comprises three 2D Hall sensors or 3D Hall sensors, wherein the three 2D Hall sensors or 3D Hall sensors are arranged at a distance from one another on the mover and form a triangular arrangement, and wherein a geometric center of the running surface of the mover is arranged on a surface of the triangular arrangement formed by the three 2D Hall sensors or 3D Hall sensors or on a connecting line between two of the three 2D, 3D Hall sensors.

This achieves the technical advantage that a measurement accuracy of the magnetic orientation field may be further increased. By arranging three 2D or 3D Hall sensors in a triangular arrangement, in which none of the three 2D or 3D Hall sensors is arranged in the geometric center of the running surface of the mover, influences of the stray field of the magnetic stator field or of the magnetic orientation field, which occur at the edges of the stator module or at contact areas of a plurality of stator segments of a stator module, may be compensated for by arranging at least one 2D or 3D Hall sensor outside the areas of the stray field.

According to an embodiment, the magnetic orientation field is embodied as a static magnetic field.

This achieves the technical advantage that a further specification of the magnetic orientation field and, associated with this, a further specification of the determination of the orientation of the mover relative to the stator may be achieved.

According to an embodiment, the magnet device is embodied on the mover and the magnetic field sensor device is formed on the stator module, wherein the preferred stator module direction is identified with the preferred sensor direction and the preferred mover direction is identified with the preferred magnetic field direction, wherein the magnetic field sensor device comprises at least one magnetic field sensor of the sensor module of the stator module, wherein the at least one magnetic field sensor is formed as a 2D Hall sensor or 3D Hall sensor, wherein the preferred sensor direction of the magnetic field sensor device is defined by one of the measuring channels of the Hall sensor, wherein the magnet device is embodied as at least one permanent magnet, and wherein the preferred magnetic field direction is formed by a north pole and a south pole of the permanent magnet.

This achieves the technical advantage of providing the simplest possible solution for generating the magnetic orientation field. For this purpose, the magnetic field device is embodied on the mover, while the magnetic field sensor device is embodied by the magnetic field sensors of the sensor module of the stator module. In this case, the magnetic field device on the mover may be embodied as a permanent magnet so that the simplest possible magnetic orientation field may be generated. By realizing the magnetic field sensor device by the magnetic field sensors of the sensor module of the stator module, no additional component is required for realizing the magnetic field sensor device. Furthermore, the created measurement values of the magnetic field sensor device may be transmitted to the controller via the usual data connection between the stator module and the controller. A further device for data transmission may thus also be avoided.

Further, a planar drive system comprising at least one controller, a stator module having a stator surface, and a mover positionable on the stator surface is provided, the stator module being arranged to generate magnetic stator fields for electrically controlling the mover along the stator surface, wherein the mover has a magnet assembly for generating a magnetic mover field, wherein a magnetic coupling between the mover and the stator module is achievable via the magnetic stator fields and the magnetic mover field, wherein the stator module comprises a sensor module with a plurality of magnetic field sensors for determining a position of the mover, wherein the stator module or the mover comprise a magnet device for generating an magnetic orientation field, the magnetic orientation field being rotationally asymmetric with respect to rotation about a rotational axis perpendicular to the stator surface and having a preferred magnetic field direction and wherein the respective other of the stator module and the mover comprises a magnetic field sensor device having a preferred sensor direction for detecting the magnetic orientation field along the preferred sensor direction, and wherein the planar drive system is embodied to perform the method for controlling a planar drive system According to an embodiment.

Herein, a planar drive system may be provided that has precise and improved control and is configured to carry out the method of the application with the aforementioned advantages.

FIG. 1 shows a schematic view of a planar drive system 200 with a stator module 300 and a mover 400.

According to the embodiment in FIG. 1, the planar drive system comprises a controller 201, a stator module 300 and a mover 400. The controller 201 is connected to the stator module 300 via a data link 203. The controller 201 is arranged to carry out a method 100 according to the application for controlling a planar drive system 200.

For a detailed description of the method according to the application for controlling a planar drive system 200 and the operation of the position assignment function 205, please refer to the description for FIG. 4, FIG. 5, FIG. 7 and FIG. 9.

The stator module 300 has a planar stator surface 303. The planar stator surface 303 is arranged on an upper surface of a stator module housing 305. A mover 400 is disposed above the stator surface 303. The stator surface 303 is part of a stator unit 307 for an electric drive of the mover 400. The stator unit 307 with the stator surface 303 may be embodied as a printed circuit board. The stator surface 303 has a square shape.

The stator unit 307 has four stator segments 308 that are connected to electronic modules within the stator module housing 305 via a contact structure 310.

The mover 400 may be driven above the stator surface 303 in at least a first direction 507 and a second direction 509. The stator surface 303 comprises a plurality of stator conductors 309, which in the embodiment shown in FIG. 1 are stator conductors 309 that are substantially aligned along the first direction 507. The stator conductors 309 are embodied to conduct current and may be energized to drive the mover 400. A stator conductor gap 311 is provided between the stator conductors 309, through which the stator conductors 309 are electrically isolated from each other. Below the stator surface 303, another arrangement of stator conductors may be provided in which the stator conductors are substantially aligned along the second direction 509.

The stator module housing 305 comprises electronic modules for driving and controlling the mover 400. For example, the electronic modules may include power modules for generating the drive currents and control modules for controlling the power modules and the drive currents. On a bottom surface of the stator module housing 305 opposite the stator surface 303, connections are arranged for connecting the stator module 300 to a plurality of connecting lines. For example, the connecting lines may include a control line for transmitting control signals for the control modules and a power supply line for supplying electrical power to the power and/or control modules. In particular, electrical energy may be supplied to the power module via the power supply line to generate the drive currents.

The stator module housing 305, the stator unit 307 and the stator surface 303 are rectangular, in particular square, in the top view of the stator surface 303.

The stator module housing 305 comprises a sectional plane 313. A sensor module may be disposed within the stator module housing 305 at the level of the sectional plane 313.

In FIG. 1, the mover 400 is provided with a preferred mover direction 441. This may be arbitrarily selected and serves exclusively to determine an orientation of the mover 400 relative to the stator module 300. The stator module 300 is provided with a likewise selectable preferred stator module direction 315. In FIG. 1, both preferred directions are arranged in parallel. However, this is not necessary and may be changed as desired. Further, a rotational axis 317 is shown oriented perpendicularly with regard to the stator surface 303 and passing through a geometric center 445 of the mover 400.

Figure 2:
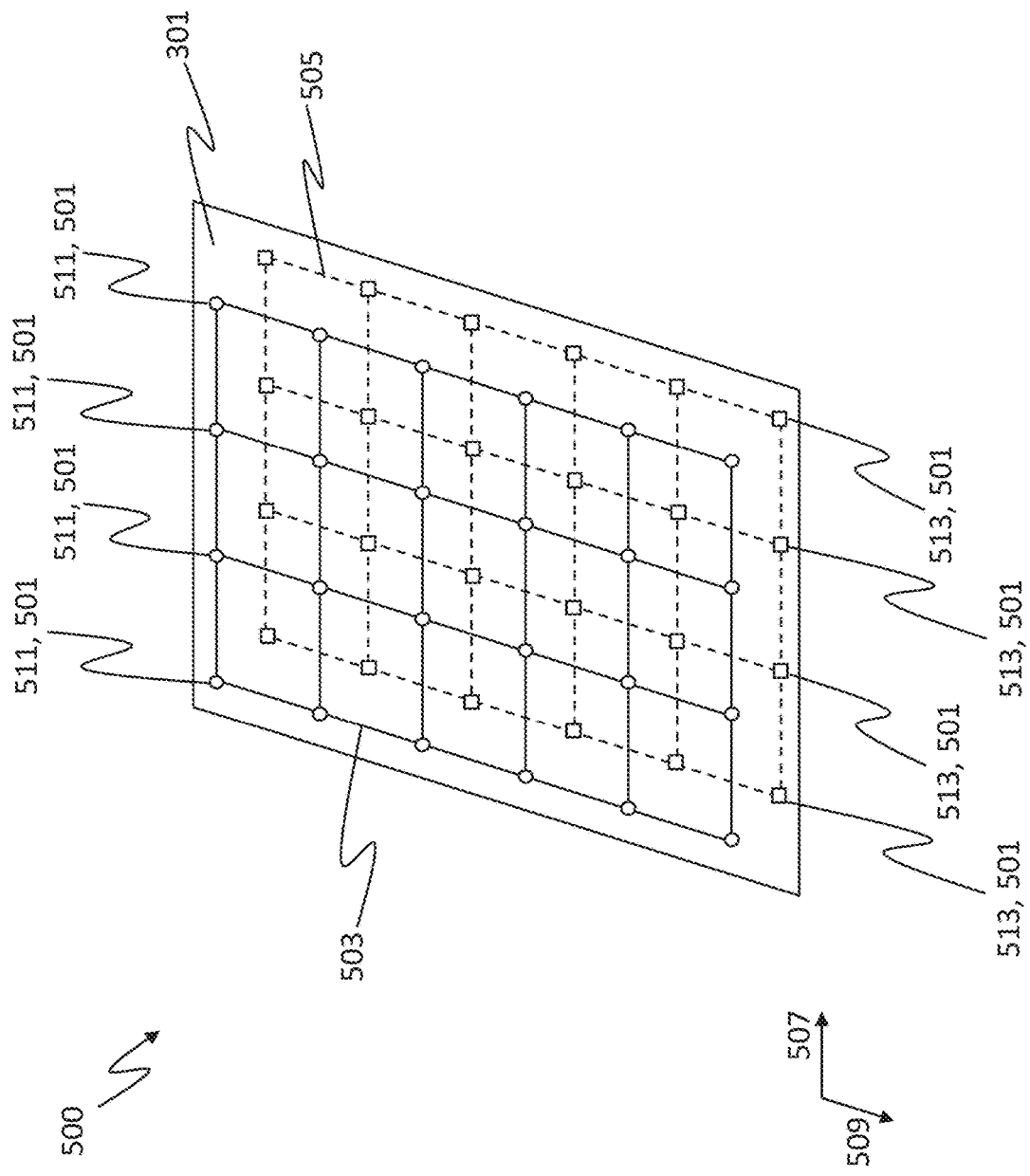
FIG. 2 is a schematic perspective view of a sensor module of the stator module according to an embodiment.

FIG. 2 shows a perspective view of a sensor module 500 for detecting a position of the mover 400 in the planar drive system 200. The sensor module 500 is arranged in a rectangular shape and has a two-dimensional arrangement of magnetic field sensors 501 on a carrier 301 of the stator module 300. The magnetic field sensors 501 are arranged on the carrier 301. The two-dimensional array of magnetic field sensors 501 includes a first periodic grid 503 of magnetic field sensors 501 and a second periodic grid 505 of magnetic field sensors 501. The magnetic field sensors 501 of the first grid 503 are indicated by round symbols, while the magnetic field sensors 501 of the second grid 505 are indicated by square symbols.

Provided that reference is made to magnetic field sensors 501 in general terms for the purposes of the application, reference 501 is used.

The first magnetic field sensors 511 are connected with solid lines to illustrate the grid structure of the first grid 503. The second magnetic field sensors 513 are connected with dashed lines to illustrate the grid structure of the second grid 505. The first magnetic field sensors 511 and the second magnetic field sensors 513 may be identical, and the round or square symbols, respectively, are only intended to symbolize the positions of the magnetic field sensors 501 associated with the respective sub-arrays.

The first grid 503 and the second grid 505 have identical structures and are shifted with regard to each other. As a result, the second magnetic field sensors 513 of the second grid 505 and the first magnetic field sensors 511 of the first grid 503 are each shifted with regard to one another.

The arrangement of magnetic field sensors 501 shown in FIG. 2 is for illustrative purposes only and may differ from the arrangement shown in FIG. 2.

The magnetic field sensors 501 are each set up to determine magnetic fields for a spatial area. Measurements of a magnetic field sensor 501 are thus limited to the respective spatial area of the respective magnetic field sensor 501. The spatial regions of the magnetic field sensors 501 may have geometrically arbitrarily embodied spatial extents and may e.g. be circular in shape. In particular, the spatial regions may have a point-shaped configuration, so that point measurements of the respective magnetic fields may be performed by the magnetic field sensors 501, in which individual magnetic field sensors 501 exclusively measure field contributions of the respective magnetic fields that are arranged directly at the positions of the respective magnetic field sensors 501.

The carrier 301 is planar so that the magnetic field sensors 501 are arranged in a plane, i.e., in a two-dimensional array.

The magnetic field sensors 501 may be embodied as Hall sensors. In particular, the magnetic field sensors 501 may be embodied as 2D or 3D Hall sensors, wherein 3D Hall sensors measure the magnetic field components in three linearly independent spatial directions. In particular, these spatial directions may include the first direction 507 and the second direction 509 as well as a third direction perpendicular to the first direction 507 and the second direction 509.

The carrier 301 may be embodied as a printed circuit board and/or a circuit board. Thus, the carrier 301 may be provided in a simple way.

The array of magnetic field sensors 501 may comprise exactly two sub-arrays of the two grids 503, 505.

Figure 3:
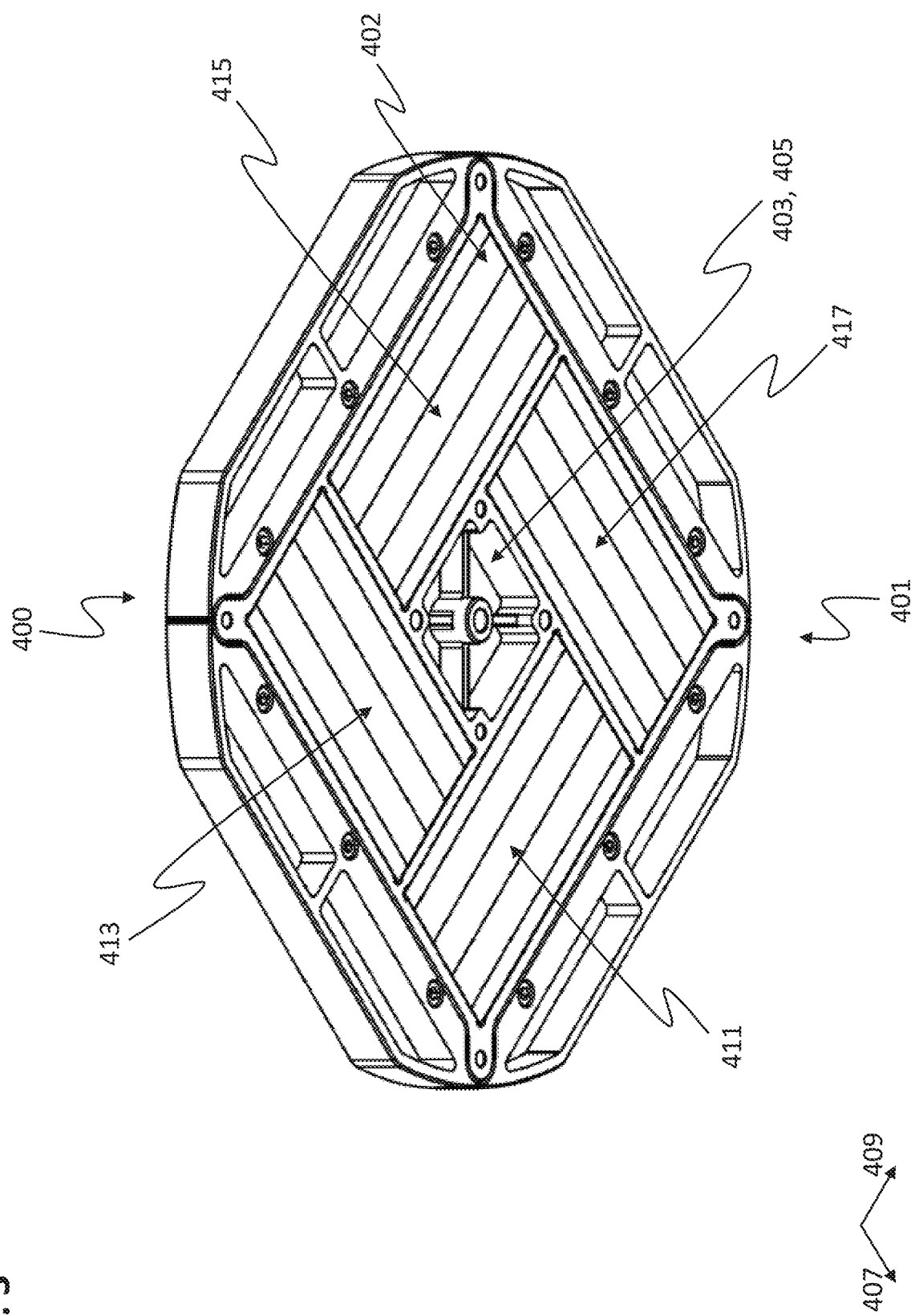
FIG. 3 shows a schematic depiction of an underside of a mover according to an embodiment.

FIG. 3 shows the mover 400 of the planar drive system 200 in a bottom view of an underside of the mover 400. In operation of the planar drive system 200, the underside of the mover 400 is arranged facing the stator surface 303 of the stator module 300. The mover 400 comprises a magnet assembly 401 on the underside thereof. The magnet assembly 401 is rectangular, in particular square, in shape and comprises a plurality of magnets. The underside of the mover 400 is flat or planar, in particular in the area of the magnets of the magnet assembly 401. In operation, the underside of the mover 400 with the magnet assembly 401 is oriented substantially parallel to the stator surface 303 and is arranged facing the stator surface 303.

The magnet assembly 401 comprises a first magnet unit 411, a second magnet unit 413, a third magnet unit 415, and a fourth magnet unit 417. The first magnet unit 411 and the third magnet unit 415 each comprise elongated drive magnets arranged side-by-side in a first mover direction 407 and extending along a second mover direction 409 oriented perpendicular to the first mover direction 407. The second magnet unit 413 and the fourth magnet unit 417 each have elongated drive magnets arranged side by side in the second mover direction 409 and extending along the first mover direction 407. In operation, the first and third magnet units 411, 415 serve to drive the mover 400 in the first mover direction 407, and the second and fourth magnet units 413, 417 serve, in operation, to drive the mover 400 in the second mover direction 409. Moreover, all of the magnet units 413, 417 serve to drive in a direction perpendicular with regard to the stator surface 303.

In the center of the magnet assembly 401, the mover 400 has a free surface 403 that is not covered by magnets of the magnet assembly 401. In the area of the free surface 403, the mover 400 has a fastening structure 405.

Figure 4:
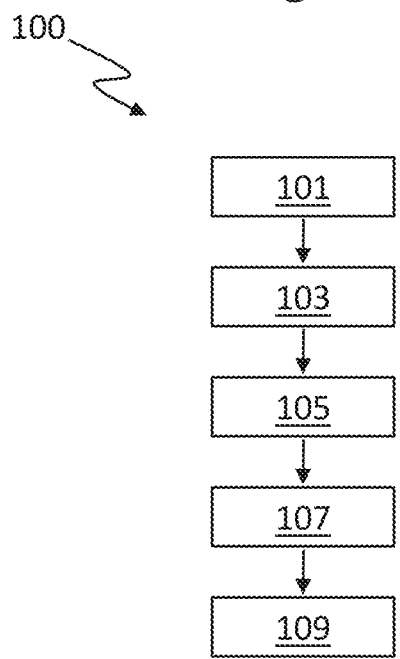
FIG. 4 is a flowchart of a method for controlling a planar drive system according to an embodiment.

FIG. 4 shows a flowchart of the method 100 for controlling a planar drive system 200 according to an embodiment.

Figure 5:
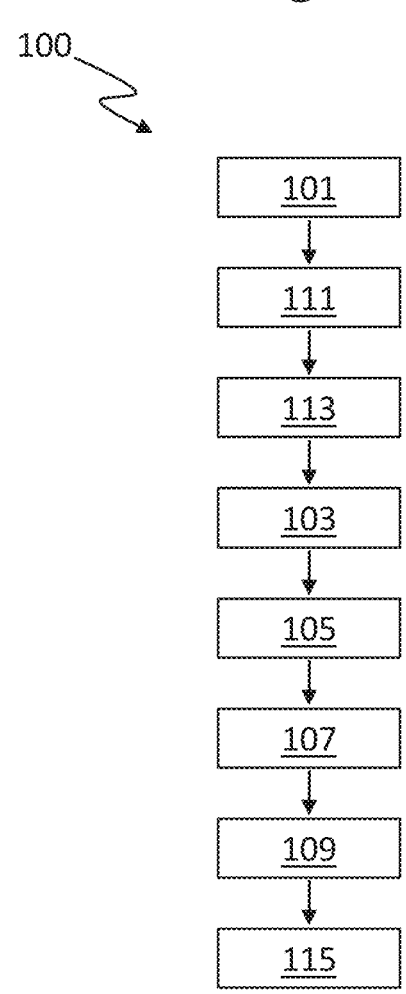
FIG. 5 is a further flowchart of the method for controlling a planar drive system according to a further embodiment.
Figure 6:
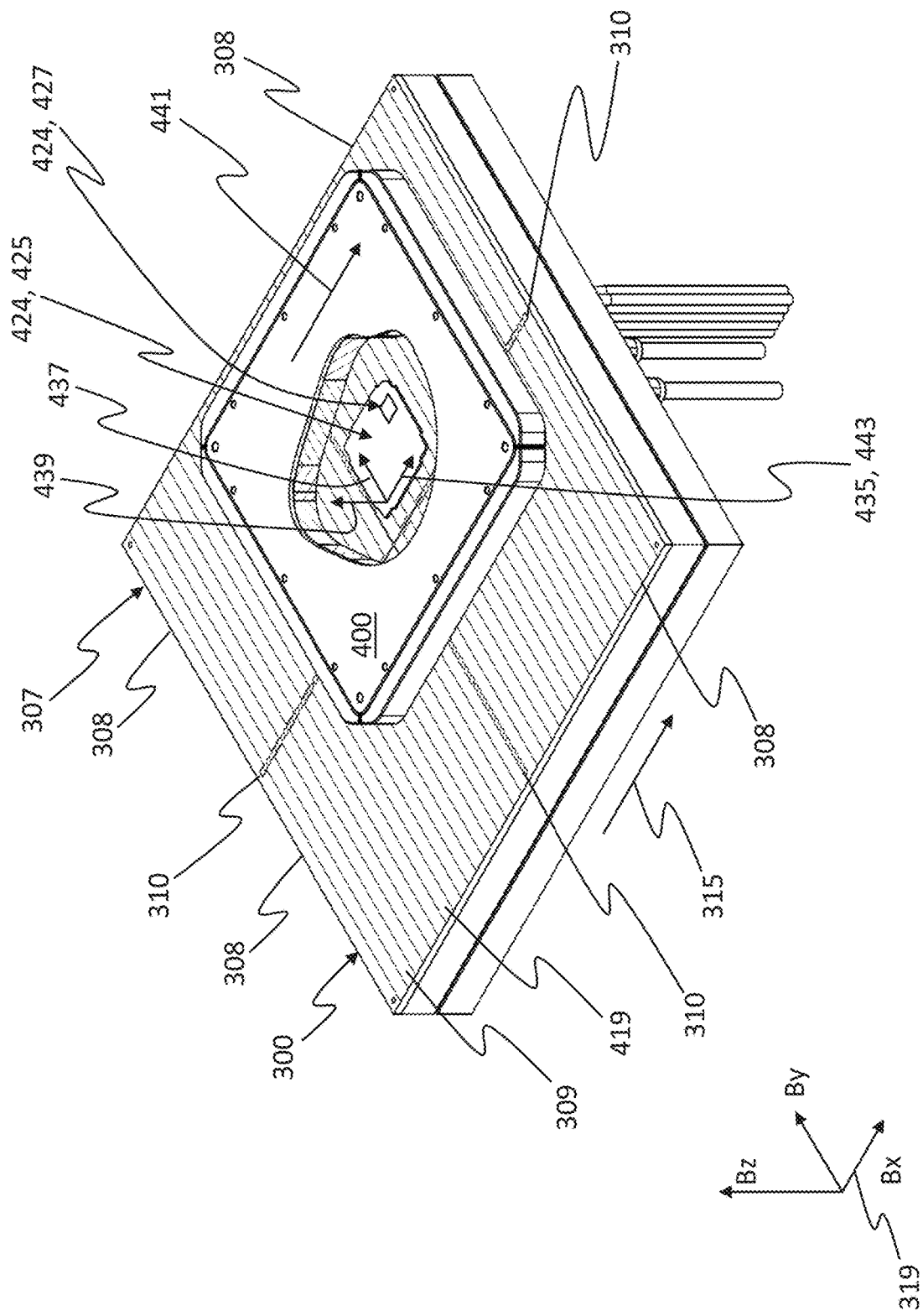
FIG. 6 is a schematic depiction of a mover and a sensor module according to an embodiment.
Figure 7:
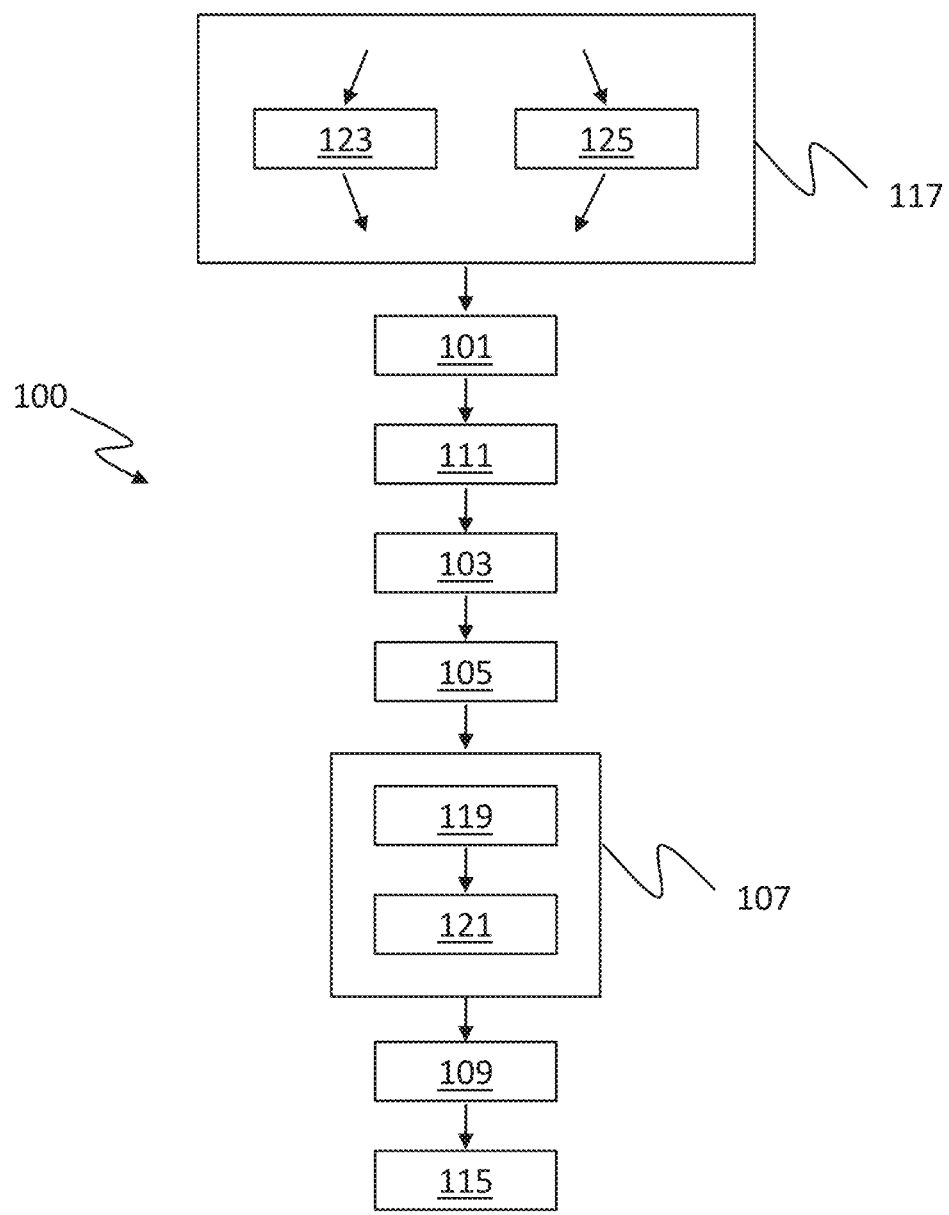
FIG. 7 is a further flowchart of the method for controlling a planar drive system according to a further embodiment.

The method 100 shown in FIGS. 4, 5 and 7 is carried out with reference to the description of FIGS. 1 to 3, 6 and 7 to 11.

The method 100 for controlling a planar drive system 200 may be applied to a planar drive system 200 comprising a controller 201, a stator module 300 having a stator surface 303, and a mover 400 that may be positioned on the stator surface 303. The stator module 300 is configured to generate magnetic stator fields for electrically controlling the mover 400 along the stator surface 303, wherein the mover 400 comprises a magnet assembly 401 for generating a magnetic mover field. A magnetic coupling between the mover 400 and the stator module 300 is achievable via the magnetic stator fields and the magnetic mover field. The stator module 300 includes a sensor module 500 having a plurality of magnetic field sensors 501 for determining a position of the mover 400.

Moreover, the stator module 300 or the mover 400 include a magnetic device 419 for generating an magnetic orientation field, the magnetic orientation field being rotationally asymmetric with respect to rotation about a rotational axis 317 perpendicular to the stator surface 303 and having a preferred magnetic field direction 319. The other component of each of the stator module 300 and the mover 400 comprise a magnetic field sensor device 424 having a preferred sensor direction 443 for detecting the magnetic orientation field along the preferred sensor direction 443.

In a preferred direction identifying step 101, a preferred stator module direction 315 of the stator module 300 is identified with the preferred magnetic field direction 319 or the preferred sensor direction 443, and a preferred mover direction 441 of the mover 400 is identified with the respective other of the preferred magnetic field direction 319 or the preferred sensor direction 443.

In this regard, the preferred stator module direction 315 is any direction parallel to the stator surface 303 for orientation of the mover 400 relative to the stator module 300. The preferred mover direction 441 is an arbitrarily selectable direction parallel to a running surface 402 arranged on a bottom surface of the mover 400, and serves to orient the mover 400 relative to the stator module 300 by determining an alignment of the preferred mover direction 441 relative to the preferred stator module direction 315.

In the present case, the preferred magnetic field direction 319 is given by an axis of symmetry of the magnetic orientation field and is oriented in parallel to the running surface 402 of the mover 400 or in parallel to the stator surface 303 of the stator module 300, depending on whether the magnetic device 419 is arranged at the mover 400 or at the stator module 300.

The magnetic field sensor device 424 may be embodied by one or a plurality of 2D/3D Hall sensors. The preferred sensor direction 443 of the magnetic field sensor device 424 is thus defined by the alignment of the measuring channels of the 2D/3D Hall sensors, in particular by the X, Y or Z measuring channels.

After identifying the preferred stator module direction 315 and the preferred sensor direction 443, the magnetic orientation field is set by the magnetic device 419 in a magnetic field setting step 103.

Subsequently, at least one measurement value of the magnetic orientation field is determined by the magnetic field sensor device 424 in a magnetic field determining step 105. Here, the at least one measurement value of the magnetic orientation field comprises at least one value of a component of the magnetic orientation field in a direction parallel to the preferred sensor direction 443. If the magnetic field sensor device 424 is embodied by at least one 2D/3D Hall sensor, the measurement value recorded by the 2D/3D Hall sensor comprises at least one component of the X, Y or Z measuring channel of the 2D/3D Hall sensor.

Subsequently, in an alignment determining step 107, an alignment of the preferred mover direction 441 relative to the preferred stator module direction 315 is determined on the basis of the measurement value of the component of the magnetic orientation field parallel to the preferred sensor direction 443. For example, the alignment of the preferred mover direction 441 relative to the preferred stator module direction 315 may be indicated by an angle between the two preferred directions. Since the preferred mover direction 441 or the preferred stator module direction 315 coincides with the preferred sensor direction 443 or the preferred magnetic field direction 319, depending on whether the magnetic device 419 is embodied at the mover 400 or at the stator module 300 and the magnetic field sensor device 424 is correspondingly embodied at the respective other component, an alignment between the preferred mover direction 441 and the preferred stator module direction 315 may be determined via a determination of the alignment of the preferred magnetic field direction 319 relative to the preferred sensor direction 443.

If the measurement of the at least one measurement value of the magnetic orientation field by the magnetic field sensor device 424 determines that the preferred sensor direction 443 of the magnetic field sensor device 424 is oriented parallel or anti-parallel to the preferred magnetic field direction 319, it may be concluded therefrom that the preferred mover direction 441 is aligned parallel or anti-parallel relative to the preferred stator module direction 315.

The determination of the alignment of the preferred mover direction 441 relative to the preferred stator module direction 315 described herein is based on the idea that measurement values of a component of the magnetic orientation field for different orientations of the preferred sensor direction 443 relative to the preferred magnetic field direction 319 result in different values of the component of the magnetic orientation field. Thus, a maximum value of the x component of the magnetic orientation field is measured for an alignment of the preferred sensor direction 443, e.g. given by an X channel of a 3D Hall sensor, parallel to the preferred magnetic field direction 319, e.g. given by the x component of the magnetic orientation field. For an orientation of the mover 400 for which the preferred sensor direction 443 given by the X-channel of the 3D Hall sensor has a substantial angle to the preferred magnetic field direction 319 given by the x-component of the magnetic orientation field, a measurement value of the magnetic orientation field recorded by the X-channel of the 3D Hall sensor has a value substantially different from the maximum value of the x-component of the magnetic orientation field.

Thus, by determining the deviations of recorded measurement values of the magnetic orientation field, or a component of the magnetic orientation field, from the maximum value of the respective component of the magnetic orientation field, orientations of the preferred sensor direction 443 relative to the preferred magnetic field direction 319 and associated orientations of the mover 400 relative to the stator module 300 may be determined by recording measurement values of the magnetic orientation field.

Analogously, conclusions may be drawn about the alignment of the two preferred directions, and thus the orientation of the mover 400 relative to the stator module 300, for any other angles between the preferred sensor direction 443 of the magnetic field sensor device 424 and the preferred magnetic field direction 319 of the magnetic orientation field.

Subsequently, an orientation determining step 109 determines a first orientation of the mover 400 relative to the stator module 300 based on the alignment of the preferred mover direction 441 relative to the preferred stator module direction 315.

For purposes of the application, an orientation of the mover 400 relative to the stator module 300 includes rotation of the mover 400 about a rotational axis 317 oriented perpendicularly with regard to the stator surface 303 and passing through a geometric center of the mover 400. In contrast, an orientation of the mover 400 relative to the stator module 300 does not include translational movement of the geometric center of the mover 400 relative to the stator module 300.

FIG. 5 shows another flowchart of the method 100 for controlling a planar drive system 200 according to another embodiment.

The embodiment in FIG. 5 is based on the embodiment in FIG. 4 and includes all the method steps from FIG. 4, which are not described again below to avoid unnecessary repetition.

After identifying the preferred directions in the preferred direction identifying step 101, a position determining step 111 determines a position of the mover 400 relative to the stator module 300. Here, a position of the mover 400 relative to the stator module 300 does not include an orientation of the mover 400 relative to the stator module 300. Two different positions of the mover 400 relative to the stator module 300 may be merged here by any number of translational movements of the mover 400 relative to the stator module 300. A determination of the position of the mover 400 relative to the stator module 300 is realized by recording a plurality of measurement values of the magnetic mover field of the mover 400 by the magnetic field sensors 501 of the sensor module 500.

Subsequently, in a locking step 113, a magnetic locking field is set by which the mover 400 is locked in the position relative to the stator module 300 previously determined in the position determining step 111. The magnetic locking field is in this context provided by the stator conductors 309 of the stator units 307 of the stator module 300. The magnetic locking field is in this context provided by the stator module 300 in such a way that an attractive magnetic coupling is generated between the magnetic mover field of the mover 400 and the magnetic locking field of the stator module 300 in a z-direction perpendicular to the stator surface 303 of the stator module 300, which attracts the mover 400 to the stator surface 303 of the stator module 300 and holds it in the locked position. Following this, an orientation of the mover 400 relative to the stator module 300 in the locked position is determined in the method steps described with respect to FIG. 4.

After determining the orientation of the mover 400 relative to the stator module 300 in the orientation determining step 109, in an orientation step 115, the first orientation of the mover 400 relative to the stator module 300 determined in the orientation determining step 109 is changed to a second orientation of the mover 400 relative to the stator module 300. For this purpose, the locking of the mover 400 in the determined position relative to the stator module 300 may additionally be released by setting the magnetic locking field in the locking step 113, so that a movement of the mover 400 relative to the stator module 300 is allowed for.

In addition to changing the first orientation of the mover 400 to the second orientation of the mover 400 relative to the stator module 300, further control of the mover 400 and associated translational movement of the mover 400 relative to the stator module 300 may be performed.

FIG. 6 shows a schematic diagram of a mover 400 and a stator module 300 according to an embodiment.

FIG. 6 shows a stator module 300 and a mover 400 of FIG. 1. The details of the two components described therein are not described again in detail below.

At the mover 400, the magnetic field sensor device 424 is embodied as a 2D/3D Hall sensor 427 arranged on a mover circuit board 425. On the stator module 300, the magnetic device 419 is embodied accordingly, which in the embodiment in FIG. 6 is as stator conductors 309 of the stator segments 308 of the stator unit 307 of the stator module 300.

The opening shown on the mover 400 in FIG. 6 is only to illustrate the magnetic field sensor device 424 embodied on the underside of the mover 400.

In the embodiment shown in FIG. 6, the 2D/3D Hall sensor 427 is embodied as a 3D Hall sensor and has a first measuring channel 435, a second measuring channel 437 and a third measuring channel 439. The three measuring channels are each arranged at right angles with regard to one another and allow for measurement of the magnetic orientation field in parallel or anti-parallel directions with regard to the respective measuring channel. Due to the plurality of measuring channels of the 2D/3D Hall sensors, different components of the magnetic orientation field may be determined.

Depending on the alignment, the magnetic stator field or magnetic orientation field generated by the stator conductors 309 of the stator module 300 has an x-component Bx, a y-component By oriented perpendicularly thereto, and a z-component Bz oriented perpendicularly thereto in turn. In the embodiment shown in FIG. 6, the 3D Hall sensor of the magnetic field sensor device 424 is oriented such that the first measuring channel 435 is oriented in parallel to the x-component Bx of the magnetic stator field or the magnetic orientation field, while the second measuring channel 437 is oriented in parallel to the y-component By and the third measuring channel 439 is oriented in parallel to the z-component Bz. In FIG. 6, the first measuring channel 435 is further identified as the preferred sensor direction 443. The identification of the first measuring channel 435 with the preferred sensor direction 443 is purely exemplary, and an identification of the preferred sensor direction 443 with the second measuring channel 437 is possible, as well. Furthermore, in the embodiment shown in FIG. 6, the preferred mover direction 441 is identified with the preferred sensor direction 443, while the preferred stator module direction 315 is identified with the x-component Bx of the magnetic orientation field. As mentioned above, the preferred directions of the stator module 300 and the mover 400 may be chosen arbitrarily and only serve to determine the orientation of the rotationally symmetrical mover 400 relative to the stator module 300.

As an alternative to the embodiment shown in FIG. 6, the magnetic field sensor device 424 may comprise a plurality of 2D/3D Hall sensors 427.

FIG. 7 shows another flowchart of the method 100 for controlling a planar drive system 200 according to another embodiment.

The embodiment of the method 100 shown in FIG. 7 refers to the embodiment shown in FIG. 6, in which the magnetic field sensor device 424 is embodied on the mover 400, while the magnetic device 419 is formed by the stator conductors 309 of the stator unit 307 of the stator module 300.

With regard to the method steps, the embodiment in FIG. 7 is based on the embodiment in FIG. 5 and comprises all the method steps described there, which are not described again in detail below.

In the embodiment shown in FIG. 7, the method 100 further comprises a determining step 117 for determining a plurality of values of the magnetic orientation field for a plurality of different alignments of the preferred mover direction 441 relative to the preferred stator module direction 315. Thus, in the determining step 117, values of the magnetic orientation field expected for each orientation may be recorded for different alignments of the mover 400 relative to the stator module 300 involving different orientations of the preferred mover direction 441 relative to the preferred stator module direction 315 as described above.

This may be done either by appropriate measurements or alternatively by calculations in appropriate simulations.

For this purpose, in a measuring step 123, measurement values of the magnetic orientation field parallel to the preferred sensor direction 443 of the at least one 2D/3D Hall sensor 427 of the magnetic field sensor device 424 may be recorded for different alignments of the mover 400 relative to the stator module 300 and, associated therewith, for different orientations of the mover preference direction 441 relative to the stator module preference direction 315. For this purpose, e.g. the mover 400 may be positioned in different orientations on the stator module 300 and corresponding orientation fields may be set in order to record corresponding measurement values of the magnetic orientation field for the individual orientations of the mover 400 relative to the stator module 300.

Preferably, the measuring step 123 may be carried out prior to performing control of the mover 400 on the stator module 300 as a calibration or adjustment of the control system. For this purpose, a corresponding data set of measurement values of the magnetic orientation field for any orientations of the mover 400 relative to the stator module 300 may be recorded for each mover 400 of the planar drive system 200 to be controlled. Alternatively, a data set for a reference mover may be recorded to be used as reference data set for controlling all movers 400 of the planar drive system 200.

As an alternative to measuring the individual measurement values of the magnetic orientation field in the measuring step 123, the expected values of the magnetic orientation field may be simulated in a corresponding simulation for various orientations of the mover 400 relative to the stator module 300 in a simulating step 125. This may be carried out on the basis of a model description of the spatial configuration of the magnetic orientation field by calculating corresponding values of the magnetic orientation field, in particular components of the magnetic orientation field parallel or antiparallel to the preferred sensor direction 443, for any orientation of the mover 400 relative to the stator module 300.

Further, the embodiment shown in FIG. 7 comprises, for determining the alignment of the preferred mover direction 441 relative to the preferred stator module direction 315 in the alignment determining step 107, determining a relation between expected measurement values of the magnetic orientation field and a corresponding alignment of the preferred mover direction 441 relative to the preferred stator module direction 315 and, associated therewith, to an alignment of the mover 400 relative to the stator module 300 in a relation determining step 119 based on the values of the magnetic orientation field determined in the determining step 117. This relation between the values of the magnetic orientation field and different orientations of the mover 400 relative to the stator module 300 may e.g. be stored in a corresponding look-up table in which different orientations of the mover 400 relative to the stator module 300 are associated with corresponding values of the magnetic orientation field. Alternatively, the relation may be stored in a mathematical relation or function.

Further, for determining the alignment of the two preferred directions in the alignment determining step 107, the at least one measurement value of the magnetic orientation field recorded in the magnetic field determining step 105 is compared with the values of the relation determined in the relation determining step 119. This comparison process carried out in the comparing step 121 may be performed based on an approximation method in which the best fitting value of the magnetic orientation field of the relation is identified for the measurement value of the magnetic orientation field.

For example, the approximation method may be based on a least square method in which a difference between a measurement value of the component of the magnetic orientation field parallel to the preferred sensor direction 443 and a value of the magnetic orientation field for a particular alignment of the preferred mover direction 441 relative to the preferred stator module direction 315 is minimized in accordance with the relation, and thus the corresponding value, i.e., the value of the magnetic orientation field of the relation that deviates the least from the measurement value of the magnetic orientation field, is determined. On the basis of the relation, an orientation of the mover 400 relative to the stator module 300 corresponding to the measurement value of the magnetic orientation field may be determined.

In particular, if the relation comprises a look-up table in which values of the magnetic orientation field are associated with orientations of the mover 400, the corresponding values of the magnetic orientation field of the look-up table may be determined via the least square method to the measurement values of the magnetic orientation field, based on which the corresponding orientations of the mover 400 relative to the stator module 300 may then be determined via the association of the look-up table.

The comparing step 121 thus first selects the most suitable value of the magnetic orientation field of the relation for the recorded measurement value of the magnetic orientation field and, associated therewith, assigns the corresponding alignment of the preferred mover direction 441 relative to the preferred stator module direction 315 of the relation to the measurement value of the magnetic orientation field. Thus, for a recorded measurement value of the magnetic orientation field, a corresponding orientation of the mover 400 relative to the stator module 300 or, associated therewith, a corresponding alignment of the preferred mover direction 441 relative to the preferred stator module direction 315 may be determined.

As an alternative to the embodiment shown in FIG. 6, the magnetic field sensor device 424 may comprise a plurality of 2D/3D Hall sensors 427. Furthermore, a plurality of measurement values of the magnetic orientation field may be recorded in the magnetic field determining step 105.

The measurement values of the magnetic orientation field mentioned herein may in particular comprise several components of the magnetic orientation field in that the magnetic field sensors are embodied as 2D/3D Hall sensors and thus have at least two different measuring channels via which at least two components of the magnetic orientation field may be measured.

The measurement values of the magnetic orientation field recorded by the magnetic field sensor device 424 may be transmitted to the controller 201 of the planar drive system 200 via a transmission device, and may be evaluated by the controller 201 according to the alignment determining step 107 and the orientation determining step 109. Alternatively, the execution of the alignment determining step 107 and orientation determining step 109 may be carried out by a processor unit embodied at the mover 400. Furthermore, a power supply to the magnetic field sensor device 424 may be achieved by a wireless power supply, in which an inductive power supply to the magnetic field sensor device 424 is achieved via a corresponding modulation of the magnetic stator field or magnetic orientation field generated by the stator module 300.

Figure 8A:
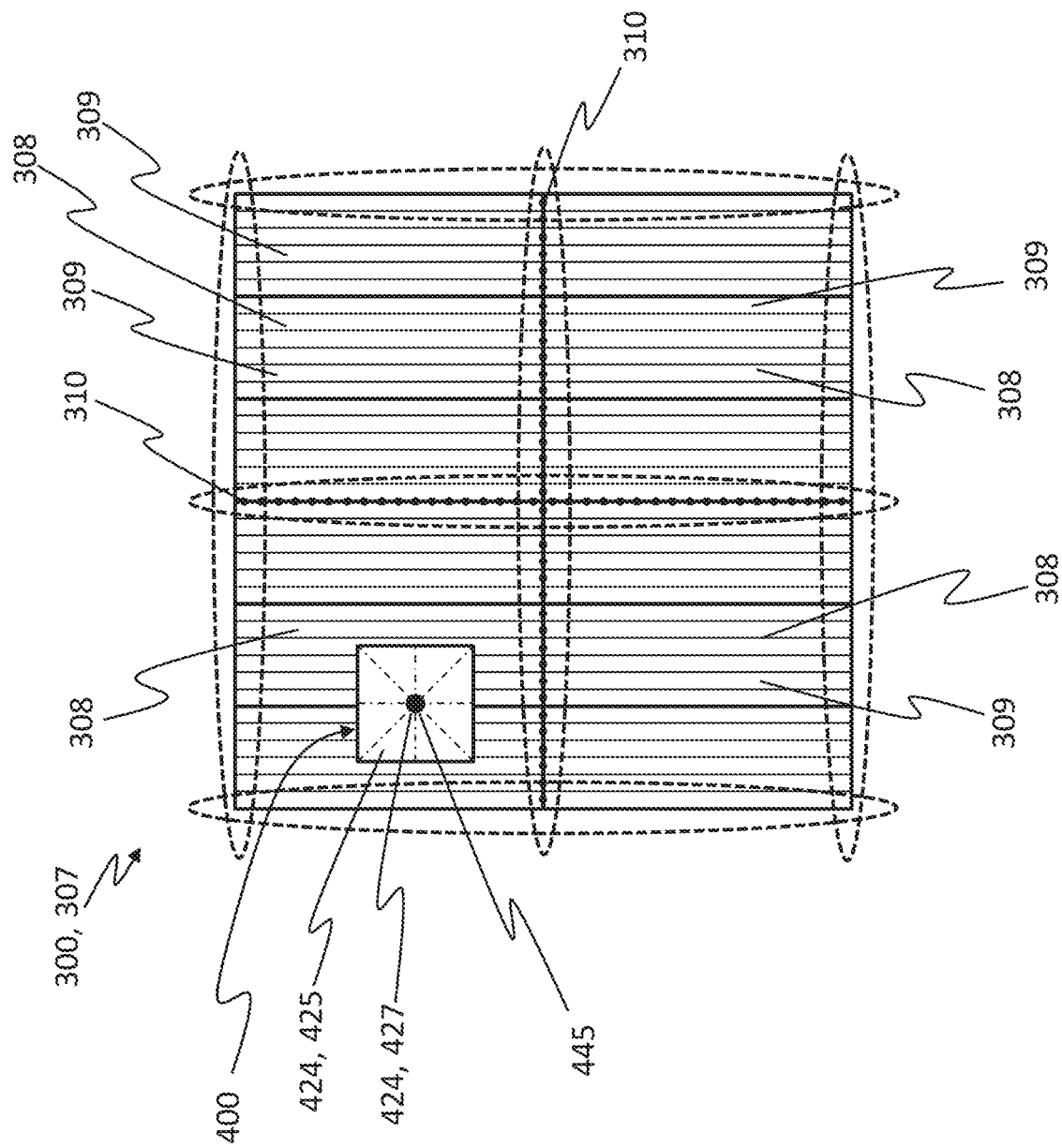
FIG. 8A is a further schematic depiction of a mover and a stator module according to a further embodiment.
Figure 8B:
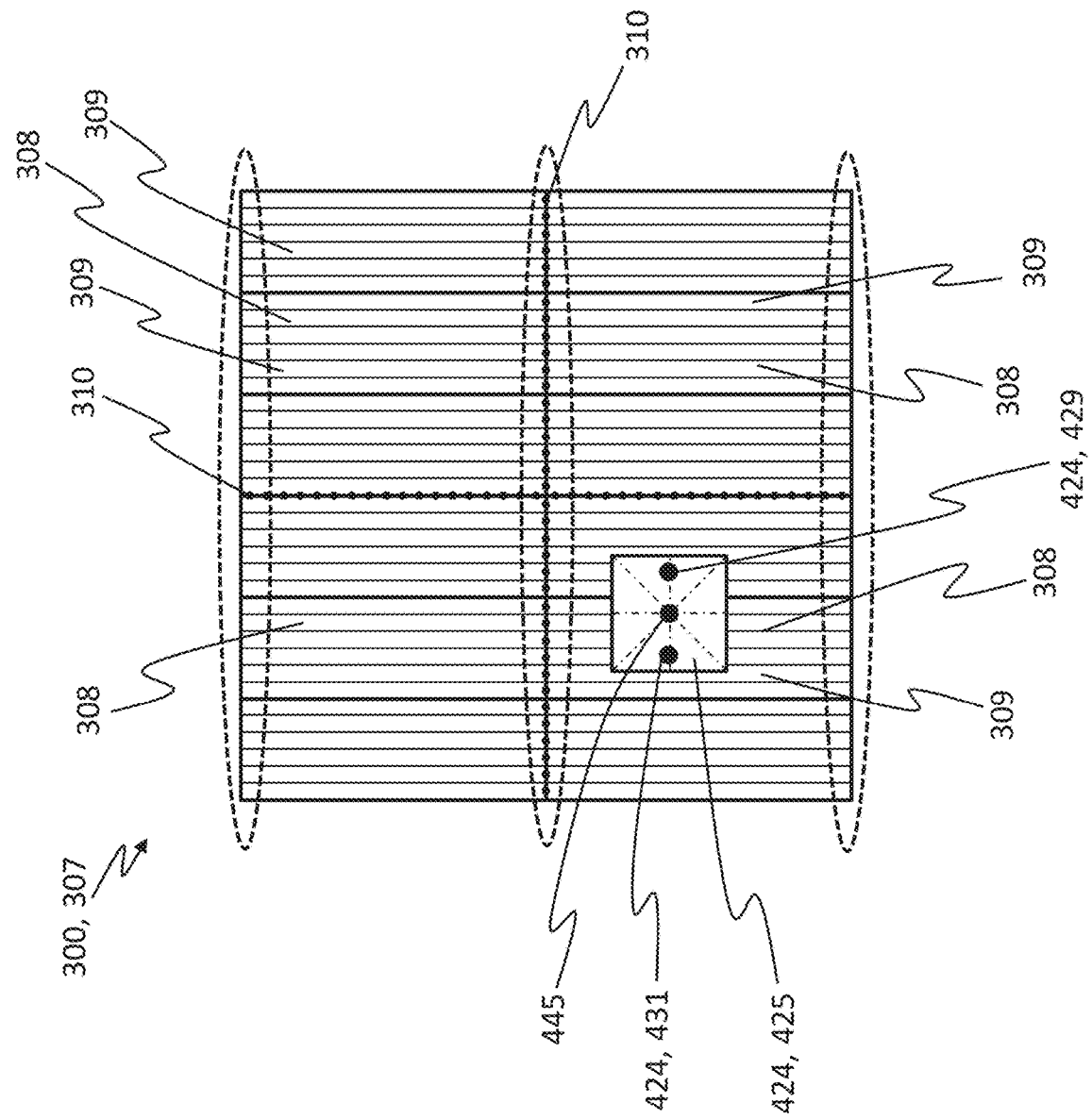
FIG. 8B is a further schematic depiction of a mover and a stator module according to a further embodiment.
Figure 8C:
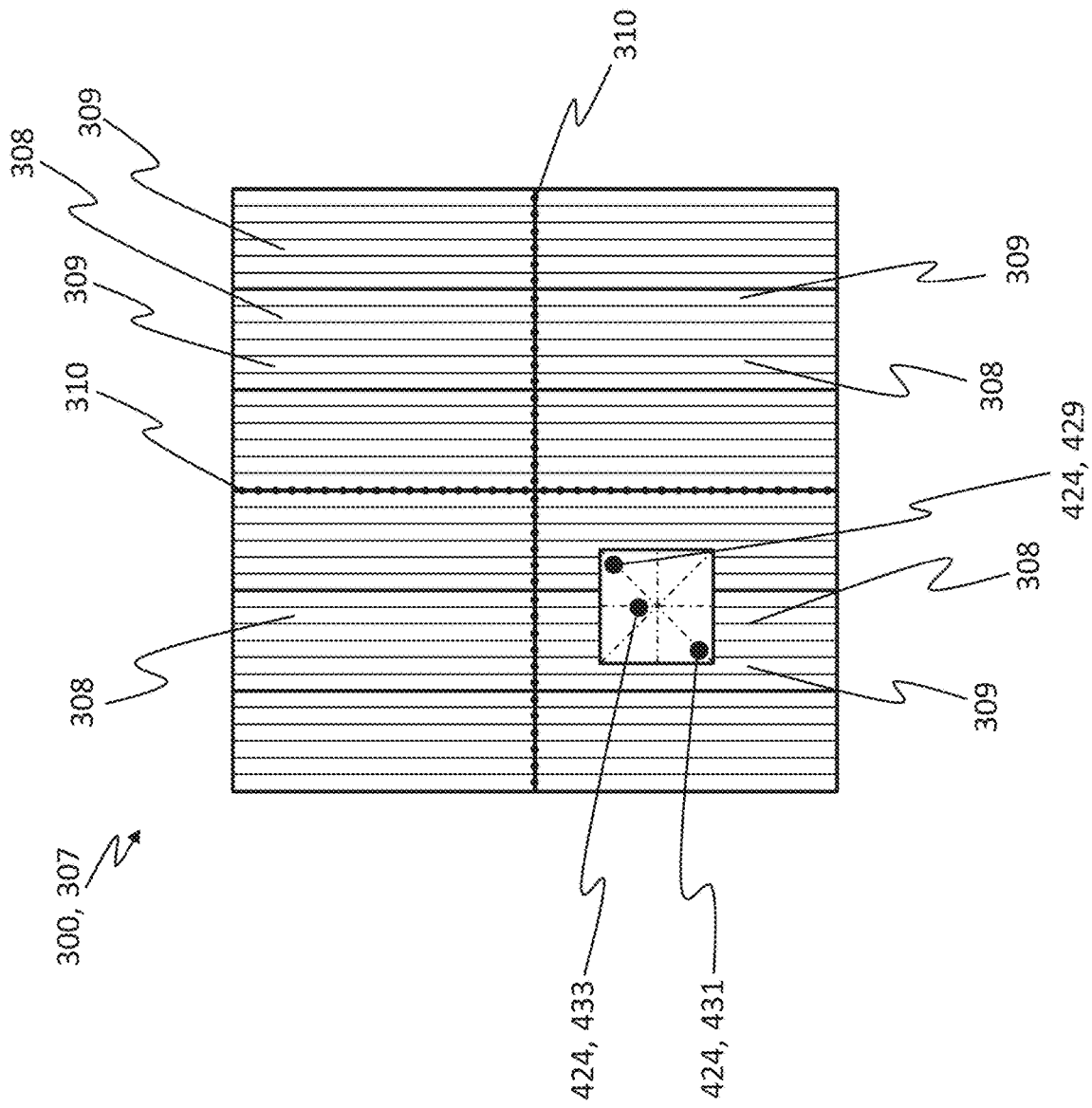
FIG. 8C is a further schematic depiction of a mover and a stator module according to a further embodiment.

FIGS. 8A to 8C illustrate three different embodiments of the magnetic field sensor device 424, each having one 2D/3D Hall sensor, two 2D/3D Hall sensors, or three 2D/3D Hall sensors.

FIG. 8A shows a further schematic depiction of a mover 400 and a stator module 300 according to another embodiment.

FIG. 8A shows a stator module 300 and a mover 400 placed thereon. The mover 400 includes the magnetic field sensor device 424, which in the embodiment shown in FIG. 8A includes the mover circuit board 425 and a 2D/3D Hall sensor 427 placed thereon. In FIGS. 8A to 8C, the mover 400 is reduced to the mover circuit board 425 and the Hall sensors placed thereon, as the sole purpose is to illustrate the effect of the placement of each Hall sensor on effects of the magnetic orientation field of the stator module 300.

In FIG. 8A, the one 2D/3D Hall sensor 427 is arranged at the geometric center 445 of the mover 400.

Due to edge effects occurring respectively at the edges of the stator module 300 or at the contact structure 310, areas arise at the respective contact structures 310 or at the edges of the stator module 300 in which an exact determination of the magnetic orientation field by the magnetic field sensor device 424 cannot be guaranteed. These areas are shown in FIGS. 8A to 8C by the vertical and horizontal dashed line ellipses, respectively.

In FIGS. 8A to 8C, only one stator module 300 is shown. However, for an operation of a planar drive system 200, usually a plurality of stator modules 300 is arranged in combination to form a large area drive surface of the planar drive system 200. For operating the mover 400 on the plurality of stator modules 300, in the embodiment of FIG. 8A in which a single 2D/3D Hall sensor 427 is arranged in the geometric center 445 of the mover 400, the problem that when the mover 400 crosses the contact structures 310 or the edges of the individual stator modules 300, the single 2D/3D Hall sensor 427 enters the areas marked with the dashed ellipses, in which no unambiguous determination of the magnetic orientation field is possible due to the prevailing edge effects, so that, if necessary, no unambiguous determining of the magnetic orientation field and, associated therewith, no unambiguous determining of the orientation of the mover 400 relative to the stator module 300 may be provided.

FIG. 8B shows another schematic depiction of a mover 400 and a stator module according to a further embodiment.

In the embodiment of FIG. 8B, in contrast to the embodiment of FIG. 8A, the magnetic field sensor device 424 comprises a first 2D/3D Hall sensor 429 and a second 2D/3D Hall sensor 431 that are spaced apart from each other at opposite edges of the mover PCB 425. A connecting line between the two 2D/3D Hall sensors passes through the geometric center 445 of the mover 400. Such an arrangement of the two first and second 2D/3D Hall sensors means that the edge effects at the two lateral edges of the illustrated stator module 300 for determining the magnetic orientation field by the first 2D/3D Hall sensor 429 and the second 2D/3D Hall sensor 431 or by the magnetic field sensor device 424 do not lead to negative effects. This may be achieved by the fact that during a right-left movement of the mover 400 over the right or left edge of the stator module 300 shown in FIG. 8B or over the edges of the stator module arranged vertically in FIG. 8B and the vertical contact structure 310, in each position of the mover 400 relative to the stator module 300, one of the two 2D/3D Hall sensors is arranged outside of the area in which a clear determination of the magnetic orientation field is not possible due to the edge effects. This effect is illustrated in FIG. 8B by the omission of the vertically arranged dash-lined ellipses, demonstrating that the arrangements of the 2D/3D Hall sensors shown in FIG. 8B may compensate for the edge effects of the vertically oriented edges or contact structures 310.

FIG. 8C shows another schematic depiction of a mover 400 and a stator module 300 according to another embodiment.

In the embodiment shown in FIG. 8C, the magnetic field sensor device 424 comprises a first 2D/3D Hall sensor 429, a second 2D/3D Hall sensor 431, and a third 2D/3D Hall sensor 433 arranged in a triangular array. The arrangement of the three 2D/3D Hall sensors shown in FIG. 8C ensures that, for any positioning of the mover 400 relative to the stator module 300, at least one of the three 2D/3D Hall sensors of the magnetic field sensor device 424 is arranged outside the areas shown in dashed lines in FIG. 8A, in which, due to the edge effects, an unambiguous determination of the magnetic orientation field is not possible for magnetic field sensors 501 arranged in these areas. The arrangement of the three 2D/3D Hall sensors shown in FIG. 8C thus allows for an unambiguous determination of the magnetic orientation field by the magnetic field sensor device 424 for any positioning of the mover 400 on the stator module 300. Deviating from the arrangement shown in FIG. 8C, an alternative triangular arrangement of the three 2D/3D Hall sensors may also lead to the described effect.

Alternatively, the magnetic field sensor device 424 may be equipped with any number of 2D/3D Hall sensors.

Figure 9:
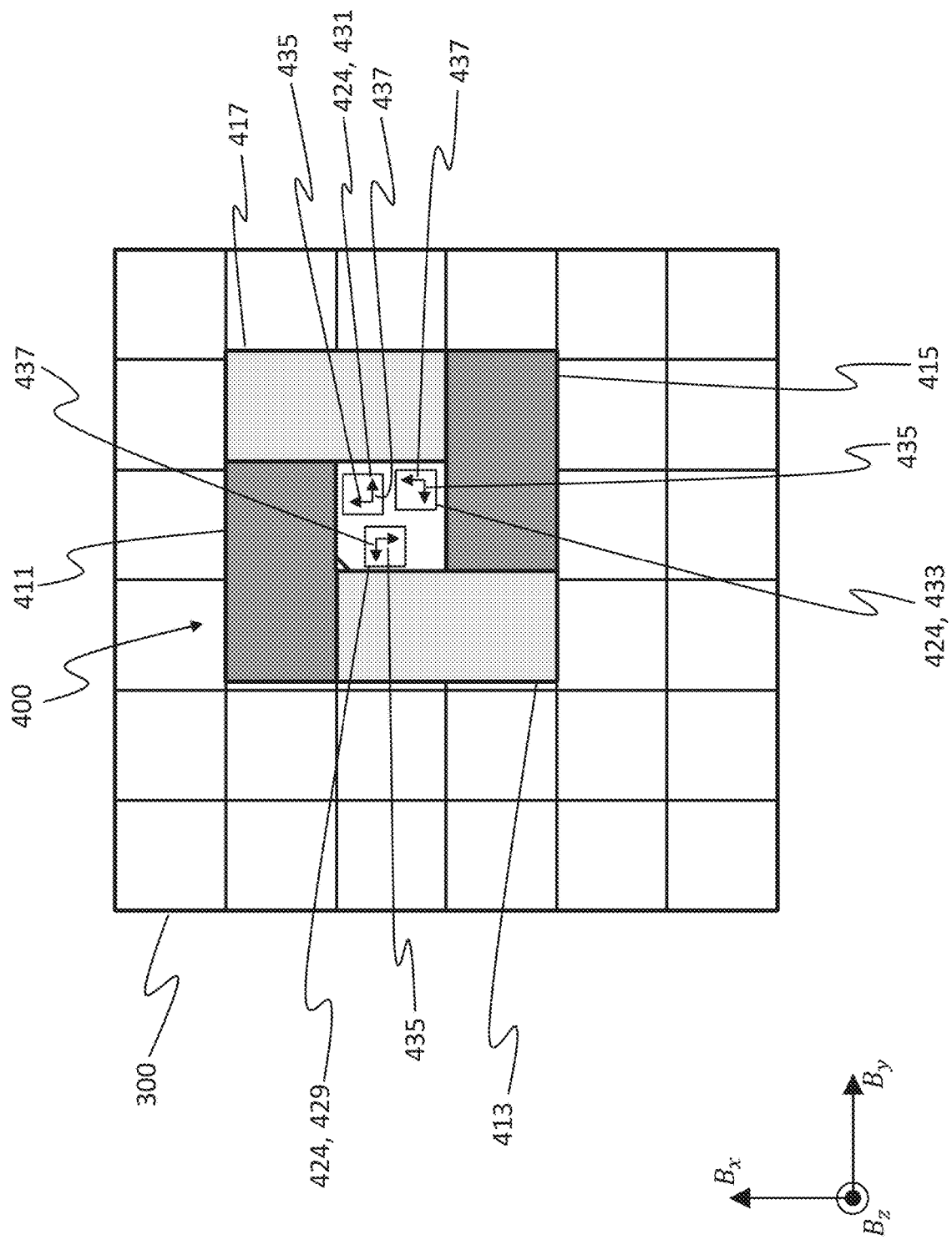
FIG. 9 is a further schematic depiction of a mover and a stator module according to a further embodiment.

FIG. 9 shows another schematic depiction of a mover 400 and a stator module 300 according to another embodiment.

FIG. 9 shows a stator module 300 having a mover 400. The mover 400 is reduced to four magnetic units 411, 413, 415, 417 and the magnetic field sensor device 424 comprising a first 2D/3D Hall sensor 429, a second 2D/3D Hall sensor 431, and a third 2D/3D Hall sensor 433.

In the embodiment shown in FIG. 9, the first measuring channel 435 of the first 2D/3D Hall sensor 429 is arranged antiparallel to the x-component Bx of the magnetic field of the stator module 300. The second measuring channel 437 of the first 2D/3D Hall sensor 429 is further arranged antiparallel to the y-component By of the magnetic field of the stator module 300. Depending on the alignment of the magnetic orientation field along the x-component Bx or the y-component By, corresponding components of the magnetic orientation field may thus be determined in the orientation of the mover 400 relative to the stator module 300 shown in FIG. 9 via the corresponding first or second measuring channels 435, 437 of the first to third 2D/3D Hall sensors 429, 431, 433.

Changing the orientation of the mover 400 relative to the stator module 300, e.g. by rotating it about the axis of rotation, changes the values recorded by the first measuring channels 435 or second measuring channels 437 of the first through third 2D/3D Hall sensors 429, 431, 433, so that an orientation of the mover 400 relative to the stator module 300 may be determined based on the changes in the individual measurement values of the magnetic orientation field of the first through third 2D/3D Hall sensors 429, 431, 433.

For this purpose, the measurement values recorded for different orientations by the 2D/3D Hall sensors 429, 431, 433 may be compared to corresponding measurement values recorded for different orientations of the mover 400 relative to the stator module 300 as reference values and stored in a look-up table. The comparisons of the recorded measurement values with the reference values stored in the look-up table may be used to determine corresponding orientations of the mover 400 relative to the stator module 300 by determining the values in the look-up table that have the least deviation from the recorded measurement values of the magnetic orientation field, and determining the corresponding orientations associated with the selected values of the magnetic orientation field in the look-up table.

The three 2D/3D Hall sensors are further arranged such that measuring channels of the individual Hall sensors are aligned parallel or antiparallel with regard to each other. For example, in the embodiment shown in FIG. 9, the first measuring channel 435 of the first 2D/3D Hall sensor 429 is arranged antiparallel to the first measuring channel 435 of the second 2D/3D Hall sensor 431 and to the second measuring channel 437 of the third 2D/3D Hall sensor 433. Accordingly, the second measuring channel 437 of the first 2D/3D Hall sensor 429 is arranged parallel to the first measuring channel 435 of the third 2D/3D Hall sensor 433 and antiparallel to the second measuring channel 437 of the second 2D/3D Hall sensor 431.

Such an arrangement, in which the measuring channels of the individual Hall sensors are aligned parallel or antiparallel to each other, allows individual measurement values of the magnetic orientation field recorded by the various Hall sensors to be used to determine the magnetic orientation field.

Alternatively, the 2D/3D Hall sensors may also be arranged differently with regard to the arrangement shown in FIG. 9 on the mover 400, so that the measuring channels of the individual Hall sensors are aligned parallel or antiparallel with regard to each other as desired.

Figure 10:
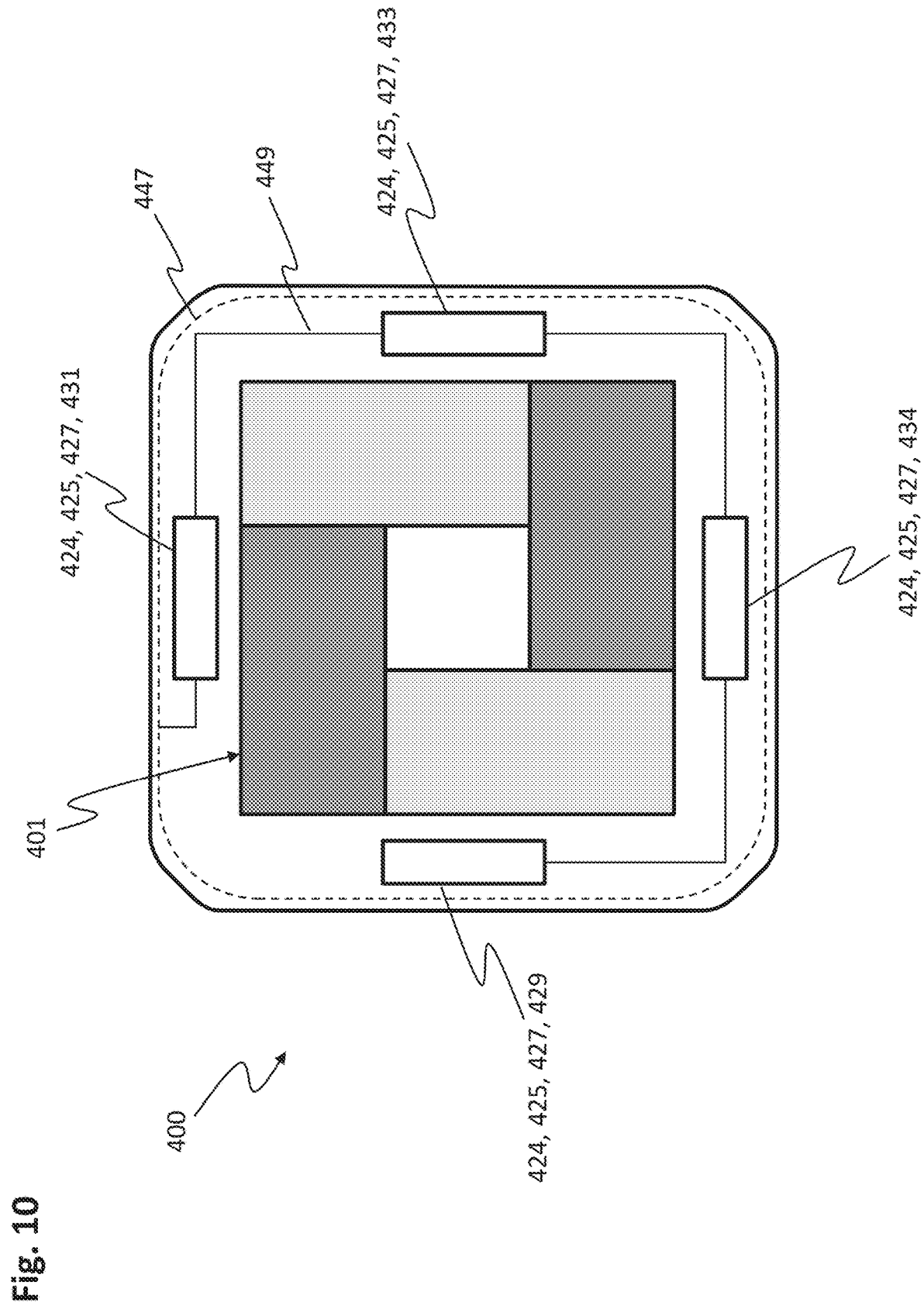
FIG. 10 is a further schematic depiction of a mover according to a further embodiment.

FIG. 10 shows a further schematic depiction of a mover 400 according to a further embodiment.

In the embodiment of FIG. 10, the magnetic field sensor device 424 comprises four 2D/3D Hall sensors 427, a first 2D/3D Hall sensor 429, a second 2D/3D Hall sensor 431, a third 2D/3D Hall sensor 433, and a fourth 2D/3D Hall sensor 434, which are not arranged in the center of the magnet assembly 401, as in the embodiment in FIG. 9, but in a mounting space of the mover 400 laterally surrounding the magnet assembly 401. In the embodiment of FIG. 10, the four 2D/3D Hall sensors 427 are each individually arranged on a mover circuit board 425. In the embodiment of FIG. 10, the four 2D/3D Hall sensors 427 are each arranged on one side of the mover 400. However, a different arrangement is also conceivable.

In the embodiment shown in FIG. 10, the four 2D/3D Hall sensors 427 are interconnected via wiring 449.

The alignment of the individual measuring channels of 435, 437, 439 of the 2D/3D Hall sensors 427 is shown in FIG. 6. Analogous to the embodiment in FIG. 9, the 2D/3D Hall sensors 427 may be arranged in such a way that the measuring channels 435, 437, 439 of different 2D/3D Hall sensors 427 are each aligned parallel or antiparallel with regard to each other. However, a different alignment of the measuring channels 435, 437, 439 is possible, as well.

For example, the 2D/3D Hall sensors 427 may be arranged in a bumper of the mover 400 that laterally surrounds the mover 400 and absorbs impacts with other movers 400 or obstacles. As an alternative to the embodiment shown in FIG. 10, the magnetic field sensor device 424 may comprise a different number of 2D/3D Hall sensors 427 arranged in one or more bumpers at the periphery of the mover 400. In particular, the 2D/3D Hall sensors 427 may be arranged on one or any number of mover circuit boards 425.

In the embodiment shown in FIG. 10, the mover 400 further comprises a coil unit 447 that may be used for power transfer and/or for communication between the mover 400 and the stator module 300. The coil unit 447 may be located in a structural space of the mover 400 laterally surrounding the magnet assembly 401, such as in the bumpers. Alternatively, the coil unit 447 may be embodied as a printed coil on the mover circuit board 425 of the magnetic field sensor device 424 itself.

The 2D/3D Hall sensors 427 may be connected to the coil unit 447 via the wiring 449.

Contrary to the illustration of FIG. 10, the magnet assembly 401 may also be embodied in such a way that no free surface is formed in the center of the magnet assembly 401. Advantages here are that without a free surface in the center of the mover 400, the dimensions of the mover 400 may be embodied smaller and thus more movers 400 may be used on a given stator surface 303.

Furthermore, by an embodiment of the coil unit 447 according to FIG. 10, a higher electrical power may be transmitted and a greater distance between the mover 400 and the stator module 300 may be maintained during power and data transmission than in the embodiment as a printed coil on the mover circuit board 425 according to the placement of the mover circuit board 425 in the center of the magnet assembly 401 according to FIG. 6. Thus, power and data transmission may be carried out even during normal operation of the planar drive system 200, e.g. while the mover 400 is being driven.

Figure 11:
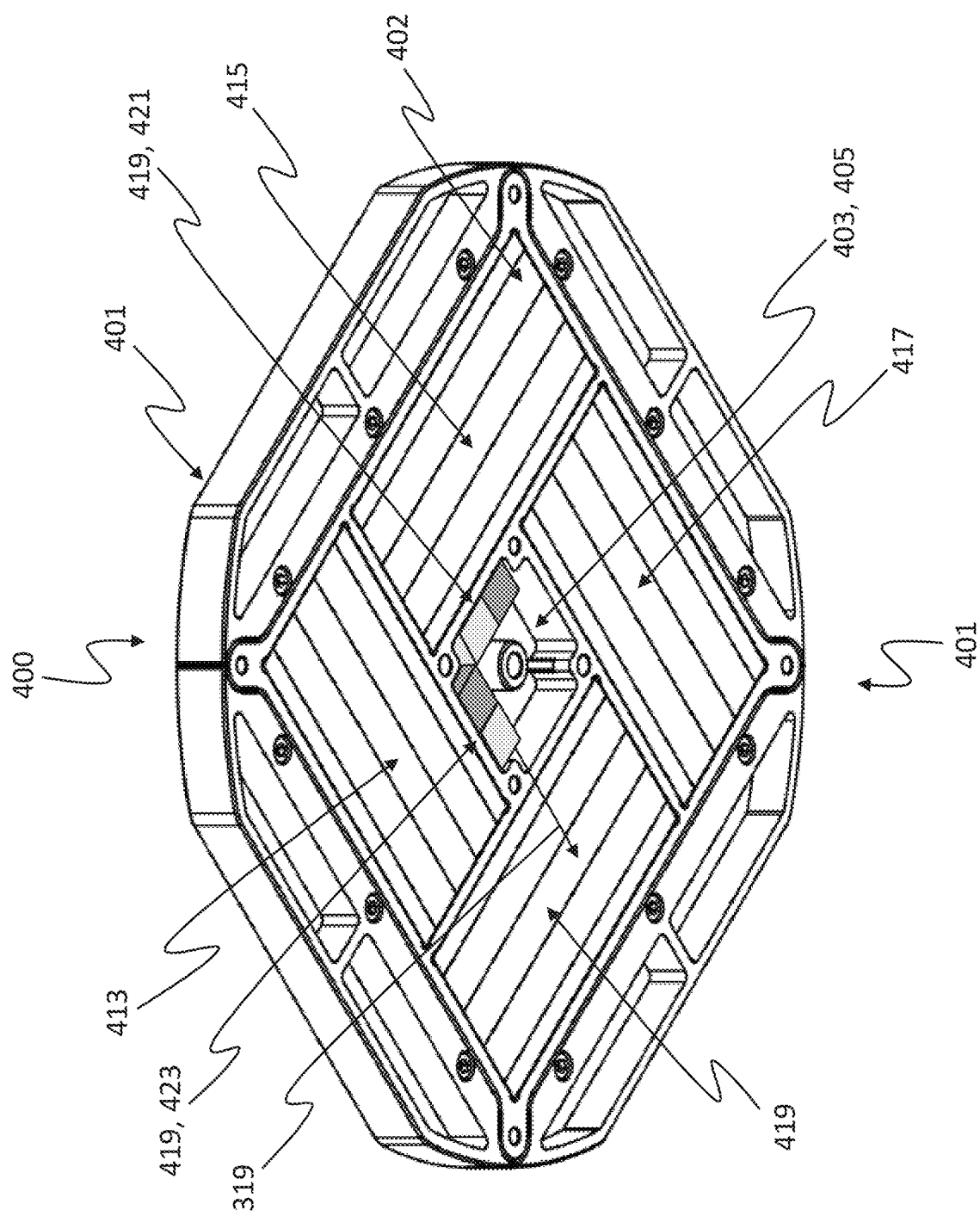
FIG. 11 is a further schematic depiction of an underside of a mover according to a further embodiment.

FIG. 11 shows another schematic view of an underside of a mover 400 according to another embodiment.

In FIG. 11, the mover 400 of FIG. 3 is shown, wherein in the embodiment of FIG. 11, the magnetic device 419 is embodied as a first permanent magnet 421 and a second permanent magnet 423 is formed on the mover 400. Furthermore, in the embodiment shown in FIG. 11, the preferred magnetic field direction 319 is defined by the alignment of the second permanent magnet 423.

According to the embodiment shown in FIG. 11, the magnetic field sensor device 424 is formed by the magnetic field sensors 501 of the sensor module 500 of the stator module 300. As an alternative to the embodiment shown in FIG. 11, the magnetic device 419 may be implemented by any number of different permanent magnets. A condition for this is that an arrangement of the arbitrary number of permanent magnets of the magnet device 419 is rotationally asymmetrical with respect to a rotational axis 317 perpendicular to the running surface 402 of the mover 400.

With the rotationally asymmetric arrangement of the permanent magnets of the magnet device 419 with respect to the axis of rotation 317, an orientation of the mover 400 relative to the stator module 300 may be unambiguously determined by the magnetic field sensors 501 of the sensor module 500 forming the magnetic field sensor device 424 based on the rotationally asymmetric magnetic orientation field generated by the rotationally asymmetric arrangement of the permanent magnets.

This invention has been described with respect to exemplary examples. It is understood that changes can be made and equivalents can be substituted to adapt these disclosures to different materials and situations, while remaining with the scope of the invention. The invention is thus not limited to the particular examples that are disclosed, but encompasses all the examples that fall within the scope of the claims.

TABLE 1

List of reference numerals: 100-313

| | |
|---|---|
| 100 | Method for controlling planar drive system |
| 101 | Preferred direction identifying step |
| 103 | Magnetic field setting step |
| 105 | Magnetic field determining step |
| 107 | Alignment determining step |
| 109 | Orientation determining step |
| 111 | Position determining step |
| 113 | Locking step |
| 115 | Orientation step |
| 117 | Determining step |
| 119 | Relation determining step |
| 121 | Comparing step |
| 123 | Measuring step |
| 125 | Simulating step |
| 200 | Planar drive system |
| 201 | Controller |
| 203 | Data connection |
| 300 | Stator module |
| 301 | Carrier |
| 303 | Stator surface |
| 305 | Stator module housing |
| 307 | Stator unit |
| 308 | Stator segment |
| 309 | Stator conductor |
| 310 | Contact structure |
| 311 | Stator conductor gap |
| 313 | Sectional plane |
| 315 | Preferred stator module direction |
| 317 | Rotational axis |
| 319 | Preferred magnetic field direction |

TABLE 2

List of reference numerals: 400-513

| | | |
|---|---|---|
| 400 | Mover | |
| 401 | Magnet assembly | |
| 402 | Running surface | |
| 403 | Free surface | |
| 405 | Fastening structure | |
| 407 | first mover direction | |
| 409 | second mover direction | |
| 411 | first magnet unit | |
| 413 | second magnet unit | |
| 415 | third magnet unit | Bx x component of magnetic field |
| 417 | fourth magnet unit | By y component of magnetic field |
| 419 | Magnetic device | Bz z component of magnetic field |
| 421 | first permanent magnet | |
| 423 | second permanent magnet | |
| 424 | Magnetic field sensor device | |
| 425 | Mover PCB | |
| 427 | 2D/3D Hall sensor | |
| 429 | first 2D/3D Hall sensor | |
| 431 | second 2D/3D Hall sensor | |
| 433 | third 2D/3D Hall sensor | |
| 434 | fourth 2D/3D Hall sensor | |
| 435 | first measuring channel | |
| 437 | second measuring channel | |
| 439 | third measuring channel | |
| 441 | Preferred mover direction | |
| 443 | Preferred sensor direction | |
| 445 | Geometric center | |
| 447 | Coil unit | |
| 449 | Wiring | |
| 500 | Sensor module | |
| 501 | Magnetic field sensor | |
| 503 | first periodic grid | |

TABLE 2-continued

List of reference numerals: 400-513

| | |
|---|---|
| 505 | second periodic grid |
| 507 | first direction |
| 509 | second direction |
| 511 | first magnetic field sensor |
| 513 | second magnetic field sensor |

The invention claimed is:

1. A method for controlling a planar drive system, wherein the planar drive system comprises:
at least a controller,
a stator module having a stator surface, and
a mover that is positionable on the stator surface,
wherein the stator module is configured to generate magnetic stator fields for electrically controlling the mover along the stator surface,
wherein the mover comprises a magnet assembly for generating a magnetic mover field,
wherein a magnetic coupling between the mover and the stator module is achievable via the magnetic stator fields and the magnetic mover field,
wherein the stator module comprises a sensor module with a plurality of magnetic field sensors for determining a position of the mover,
wherein the stator module or the mover comprises a magnet device for generating an magnetic orientation field,
wherein the magnetic orientation field is rotationally asymmetric with respect to rotation about a rotational axis perpendicular to the stator surface and comprises a preferred magnetic field direction, and
wherein a respective other of the stator module and the mover comprises a magnetic field sensor device having a preferred sensor direction for detecting the magnetic orientation field along the preferred sensor direction;
the method comprising:
identifying a preferred stator module direction of the stator module with the preferred magnetic field direction or the preferred sensor direction, and identifying a preferred mover direction of the mover with the respective other of the preferred magnetic field direction or the preferred sensor direction in a preferred direction identifying step, wherein the preferred stator module direction is oriented in parallel to the stator surface of the stator module, and wherein the preferred mover direction is oriented in parallel to a running surface of the mover;
setting the magnetic orientation field by the magnet device in a magnetic field setting step;
recording at least one measurement value of the magnetic orientation field with the aid of the magnetic field sensor device in a magnetic field determining step, wherein the at least one measurement value of the magnetic orientation field comprises at least one value of a component of the magnetic orientation field in a direction parallel to the preferred sensor direction;
determining an alignment of the preferred mover direction relative to the preferred stator module direction based on the measurement value of the component of the magnetic orientation field parallel to the preferred sensor direction in an alignment determining step; and
determining a first orientation of the mover on the stator module on the basis of the alignment of the preferred mover direction relative to the preferred stator module direction in an orientation determining step, wherein a first orientation of the mover relative to the stator module is transferable into a second orientation of the mover relative to the stator module via a rotation of the mover relative to the stator module about the rotational axis oriented perpendicularly with regard to the stator surface and passing through a geometric center of the mover.

2. The method according to claim 1, further comprising:
determining a position of the mover relative to the stator module by recording a plurality of measurement values of the magnetic mover field of the mover with the aid of magnetic field sensors of the sensor module of the stator module in a position determining step,
wherein a first position of the mover relative to the stator module is transferrable to a second position of the mover relative to the stator module via a translation of the geometric center of the mover relative to the stator module in a translation direction perpendicular to the rotation axis.

3. The method according to claim 1, further comprising:
setting a magnetic locking field by the stator module for locking the mover in position in a locking step,
wherein the magnetic locking field is oppositely oriented to the magnetic mover field such that an attractive magnetic coupling is created between the magnetic locking field and the magnetic mover field.

4. The method according to claim 1, further comprising:
orienting the mover from the first orientation to a second orientation on the basis of the alignment of the preferred mover direction relative to the preferred stator module direction in an orientation step.

5. The method according to claim 1,
wherein the magnet device is embodied at the stator module and the magnetic field sensor device is embodied at the mover,
wherein the preferred stator module direction is identified with the preferred magnetic field direction and the preferred mover direction is identified with the preferred sensor direction,
wherein the magnetic field sensor device comprises at least one 2D Hall sensor or 3D Hall sensor, wherein the preferred sensor direction of the magnetic field sensor device is defined by a measuring channel of the Hall sensor, and
wherein the magnet device is formed by a stator unit of the stator module for generating the stator fields for driving the mover.

6. The method according to claim 5, further comprising:
determining a plurality of values of the magnetic orientation field for a plurality of different alignments of the preferred mover direction relative to the preferred stator module direction in a determining step; and
determining a relation between a value of the magnetic orientation field and an alignment of the preferred mover direction relative to the preferred stator module direction based on the plurality of values of the magnetic orientation field for the plurality of different alignments of the preferred mover direction relative to the preferred stator module direction in a relation determining step;
wherein the alignment determining step comprises:
comparing the measurement value of the component of the magnetic orientation field parallel to the preferred sensor direction with the relation between the value of the magnetic orientation field and the alignment of the preferred mover direction relative to the preferred stator module direction in a comparing step.

7. The method according to claim 6, wherein the determining step comprises:
recording a plurality of measurement values of components of the magnetic orientation field parallel to preferred sensor directions of the magnetic field sensor device for a plurality of different alignments of the preferred mover direction relative to the preferred stator module direction by the magnetic field sensor device in a measuring step; or
calculating the plurality of values of components of the magnetic orientation field in parallel to preferred sensor directions of the magnetic field sensor device for the plurality of different alignments of the preferred mover direction relative to the preferred stator module direction based on a model description of the magnetic orientation field in a simulating step.

8. The method according to claim 6, wherein the comparing in the comparing step is carried out via an approximation method.

9. The method according to claim 5, wherein the mover further comprises a transmission unit configured to transmit the measurement values of the magnetic orientation field recorded in the magnetic field determining step to the controller, and wherein the alignment determining step and the orientation determining step are carried out by the controller.

10. The method according to claim 5, wherein the mover further comprises a processor unit configured to perform the alignment determining step and the orientation determining step, and a transmission unit configured to transmit the alignment determined in the alignment determining step and/or the orientation determined in the orientation determining step to the controller.

11. The method according to claim 5, wherein the magnetic field sensor device of the mover comprises a plurality of 2D Hall sensors or a plurality of 3D Hall sensors, wherein measuring channels of the 2D or 3D Hall sensors are each arranged parallel or antiparallel with regard to each other at the mover.

12. The method according to claim 11, wherein the magnetic field sensor device of the mover comprises two 2D Hall sensors or 3D Hall sensors, wherein the two 2D Hall sensors or 3D Hall sensors are spaced apart from each other on the mover, and wherein a connecting line between the two 2D, 3D Hall sensors passes through a geometric center of the running surface of the mover.

13. The method according to claim 11, wherein the magnetic field sensor device of the mover comprises three 2D Hall sensors or 3D Hall sensors, wherein the three 2D Hall sensors or 3D Hall sensors are spaced apart from one another at the mover and form a triangular array, and wherein a geometric center of the running surface of the mover is arranged on a surface of the triangular array embodied by the three 2D Hall sensors or 3D Hall sensors or on a connecting line between two of the three 2D, 3D Hall sensors.

14. The method according to claim 1,
wherein the magnet device is embodied at the mover and the magnetic field sensor device is embodied at the stator module,
wherein the preferred stator module direction is identified with the preferred sensor direction and the preferred mover direction is identified with the preferred magnetic field direction,
wherein the magnetic field sensor device comprises at least one magnetic field sensor of the sensor module of the stator module, wherein the at least one magnetic field sensor is embodied as a 2D Hall sensor or 3D Hall sensor, wherein the preferred sensor direction of the magnetic field sensor device is defined by one of the measuring channels of the Hall sensor, and wherein the magnet device is embodied as at least one permanent magnet, wherein the preferred magnetic field direction is formed by a north pole and a south pole of the permanent magnet.

15. A planar drive system configured to carry out the method according to claim 1, comprising:
   at least a controller,
   a stator module having a stator surface, and
   a mover that is positionable on the stator surface;
   wherein the stator module is configured to generate magnetic stator fields for electrically controlling the mover along the stator surface,
   wherein the mover comprises a magnet assembly for generating a magnetic mover field,
   wherein a magnetic coupling between the mover and the stator module is achievable via the magnetic stator fields and the magnetic mover field,
   wherein the stator module comprises a sensor module having a plurality of magnetic field sensors for determining a position of the mover,
   wherein the stator module or the mover comprise a magnetic device for generating an magnetic orientation field, the magnetic orientation field being rotationally asymmetric with respect to rotation about a rotational axis perpendicular to the stator surface and having a magnetic field preferential direction, and
   wherein the respective other of the stator module and the mover comprises a magnetic field sensor device having a preferred sensor direction for detecting the magnetic orientation field along the preferred sensor direction.

* * * * *